US012401310B2

(12) United States Patent
Inomata et al.

(10) Patent No.: US 12,401,310 B2
(45) Date of Patent: Aug. 26, 2025

(54) POWER CONVERSION DEVICE AND POWER CONVERSION METHOD

(71) Applicant: KABUSHIKI KAISHA YASKAWA DENKI, Kitakyushu (JP)

(72) Inventors: Kentaro Inomata, Kitakyushu (JP); Akira Yamazaki, Kitakyushu (JP); Takanori Iwaki, Kitakyushu (JP); Joji Ebisu, Kitakyushu (JP); Shingo Fukumaru, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 200 days.

(21) Appl. No.: 18/460,227

(22) Filed: Sep. 1, 2023

(65) Prior Publication Data

US 2024/0097595 A1 Mar. 21, 2024

(30) Foreign Application Priority Data

Sep. 9, 2022 (JP) .................. 2022-144051

(51) Int. Cl.
*H02P 27/08* (2006.01)
*H02M 7/483* (2007.01)
*H02P 25/022* (2016.01)

(52) U.S. Cl.
CPC ............ *H02P 27/08* (2013.01); *H02M 7/483* (2013.01); *H02P 25/022* (2013.01)

(58) Field of Classification Search
CPC .......... H02P 27/08; H02P 27/14; H02P 21/22; H02P 25/022; H02P 25/03; H02P 9/302; H02P 23/03; H02P 29/032; H02P 2201/05; H02P 2201/07; H02P 2201/09; H02P 2207/076; H02P 2207/05; H02P 2209/01; H02P 21/0089; H02P 23/07; H02P 25/062; H02P 25/064; B60L 2210/40; H02J 7/04; H02M 3/33584; H02M 7/797; H02M 7/487; H02M 1/4233; H02M 7/5387; H02M 7/00; H02M 7/5395; H02M 7/483
See application file for complete search history.

(56) References Cited

U.S. PATENT DOCUMENTS

2022/0302820 A1* 9/2022 Tada ..................... H02M 7/487

FOREIGN PATENT DOCUMENTS

JP H09-247805 A 9/1997
JP 3841254 B2 11/2006

* cited by examiner

*Primary Examiner* — Antony M Paul
(74) *Attorney, Agent, or Firm* — Osha Bergman Watanabe & Burton LLP

(57) ABSTRACT

To provide a power conversion device that is effective for improving controllability of power in power conversion for multilevel voltage output. A power conversion device includes a switching circuit configured to supply a current to a motor by connecting and disconnecting a first point having a first potential, a second point having a second potential greater than the first potential, and a neutral point having a neutral potential between the first potential and the second potential to and from the motor, a neutral potential control unit configured to control the switching circuit in a manner to maintain the neutral potential within a target range, and a current control unit configured to increase a supply current to the motor without affecting a driving force generated by the motor at least when controlling the switching circuit 16 by the neutral potential control unit.

16 Claims, 13 Drawing Sheets

[FIG. 1]
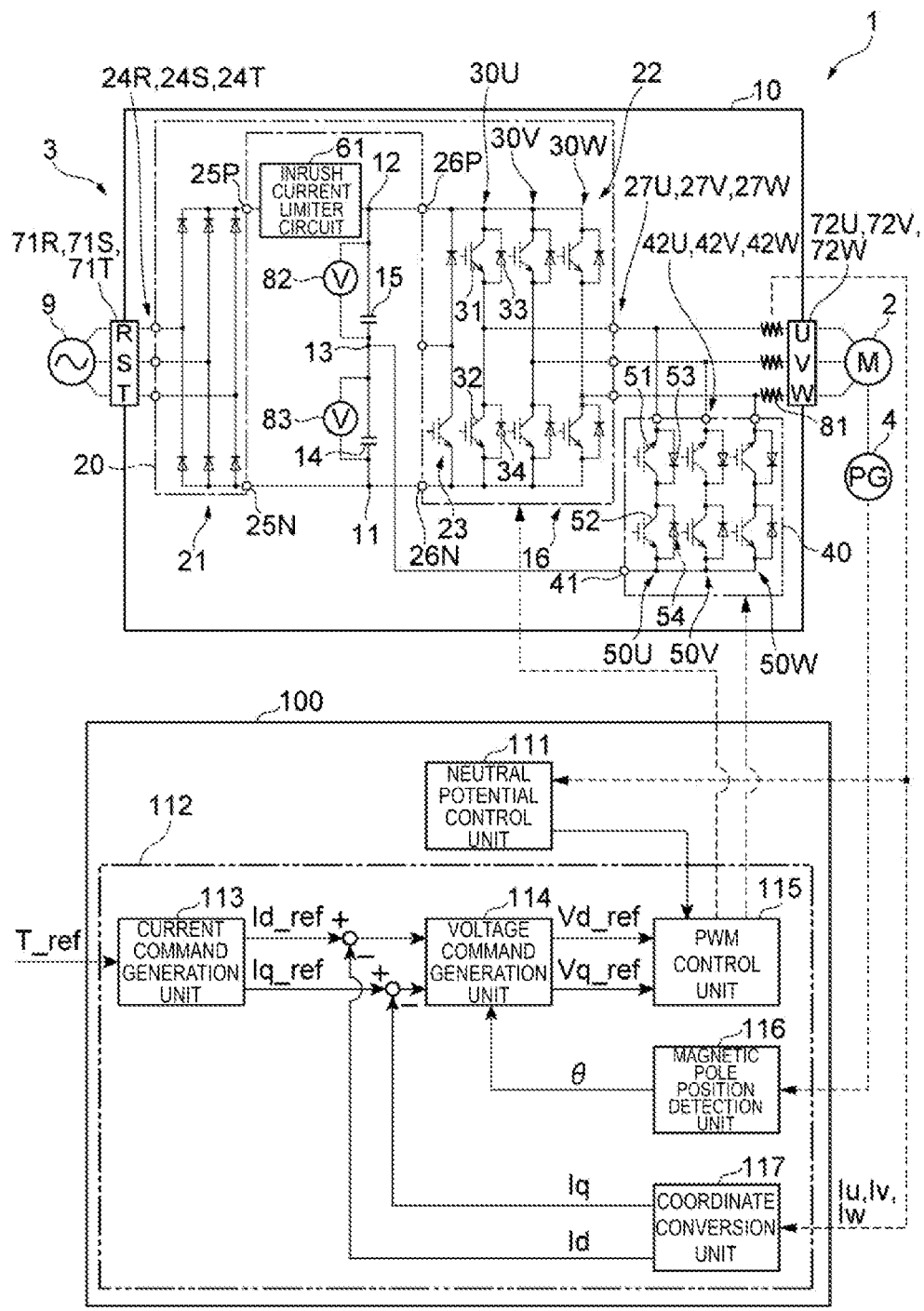

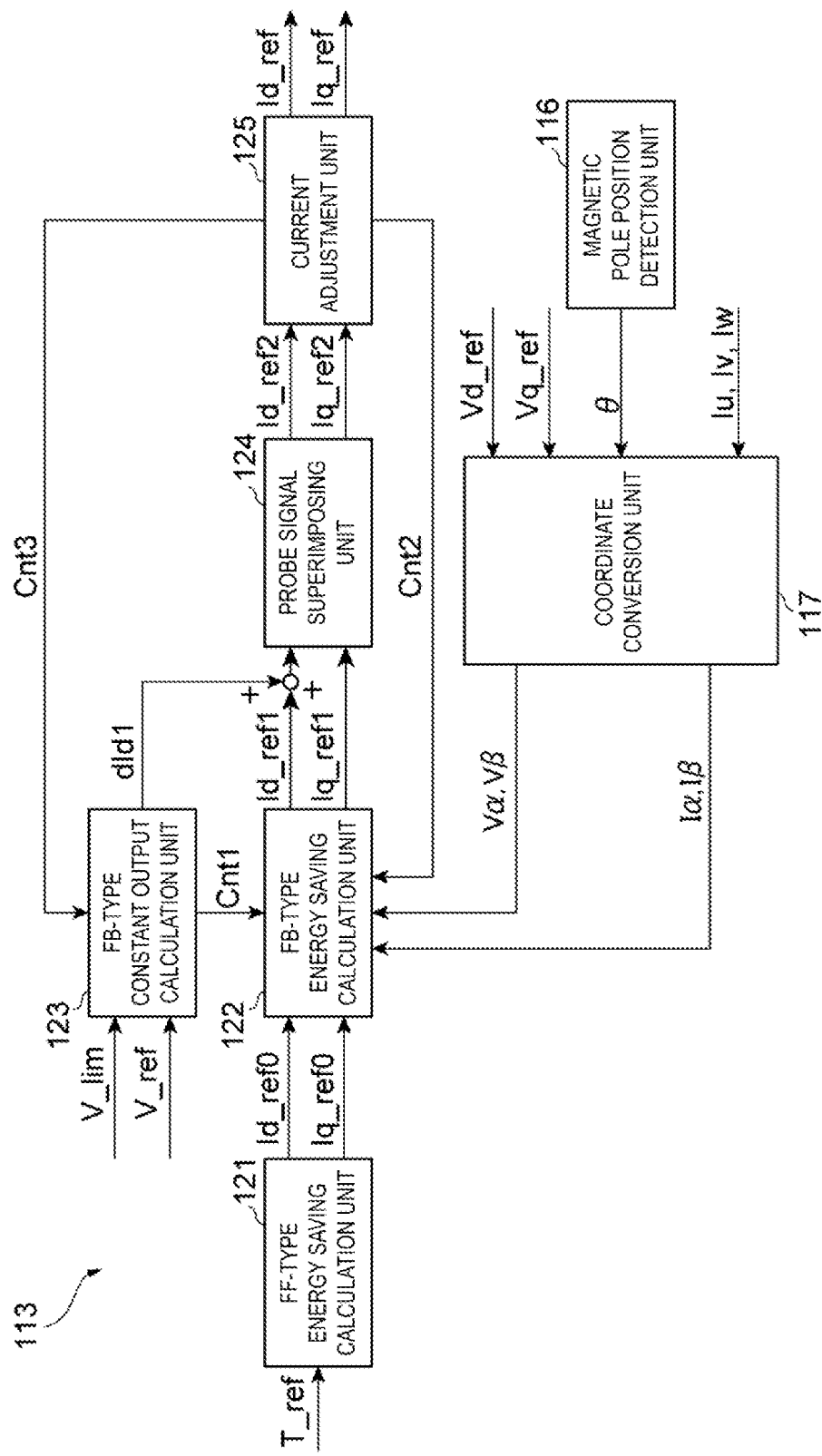

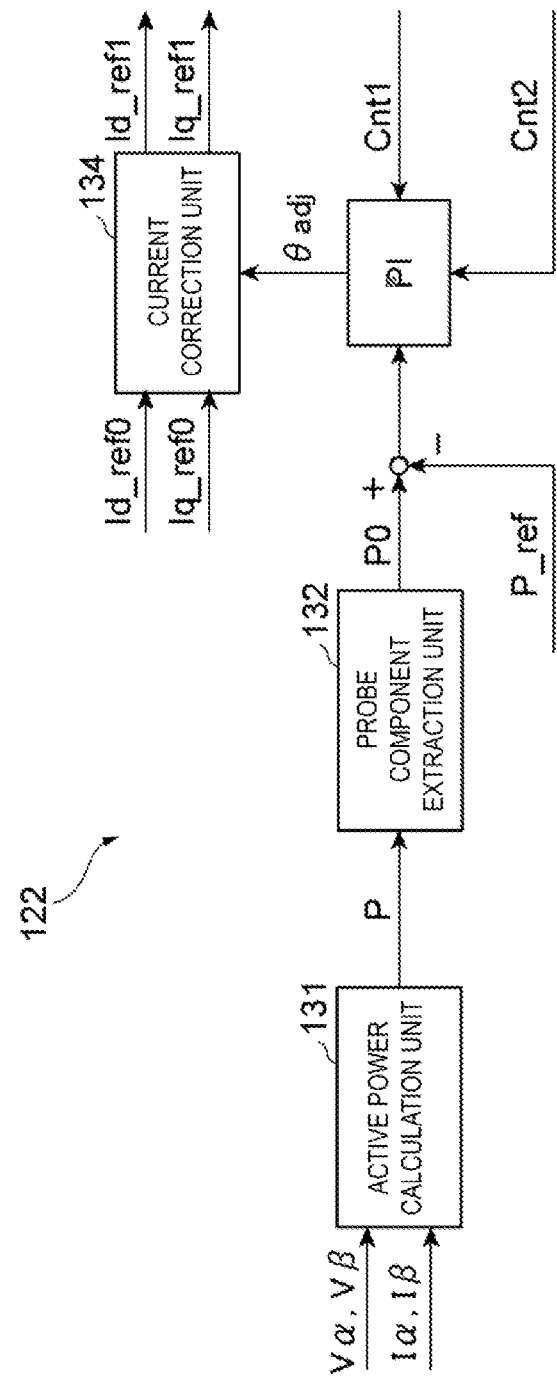

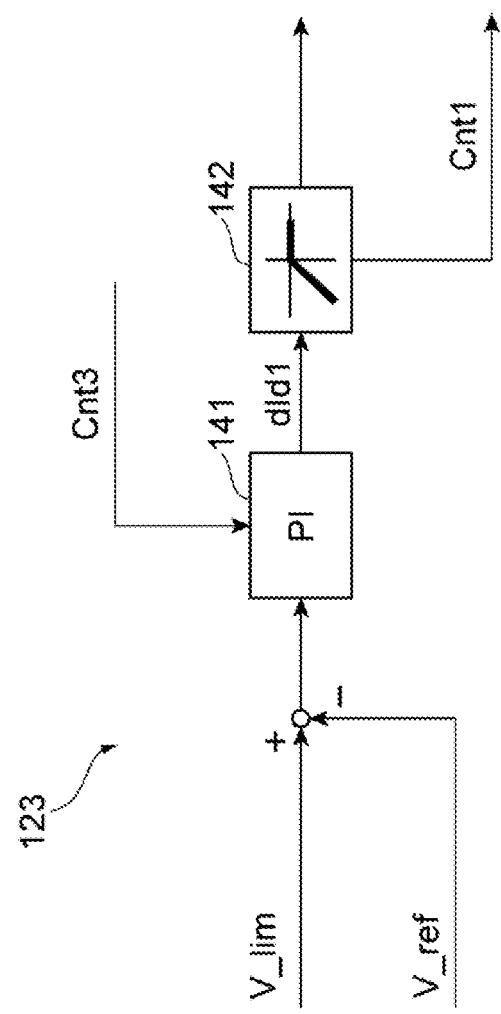

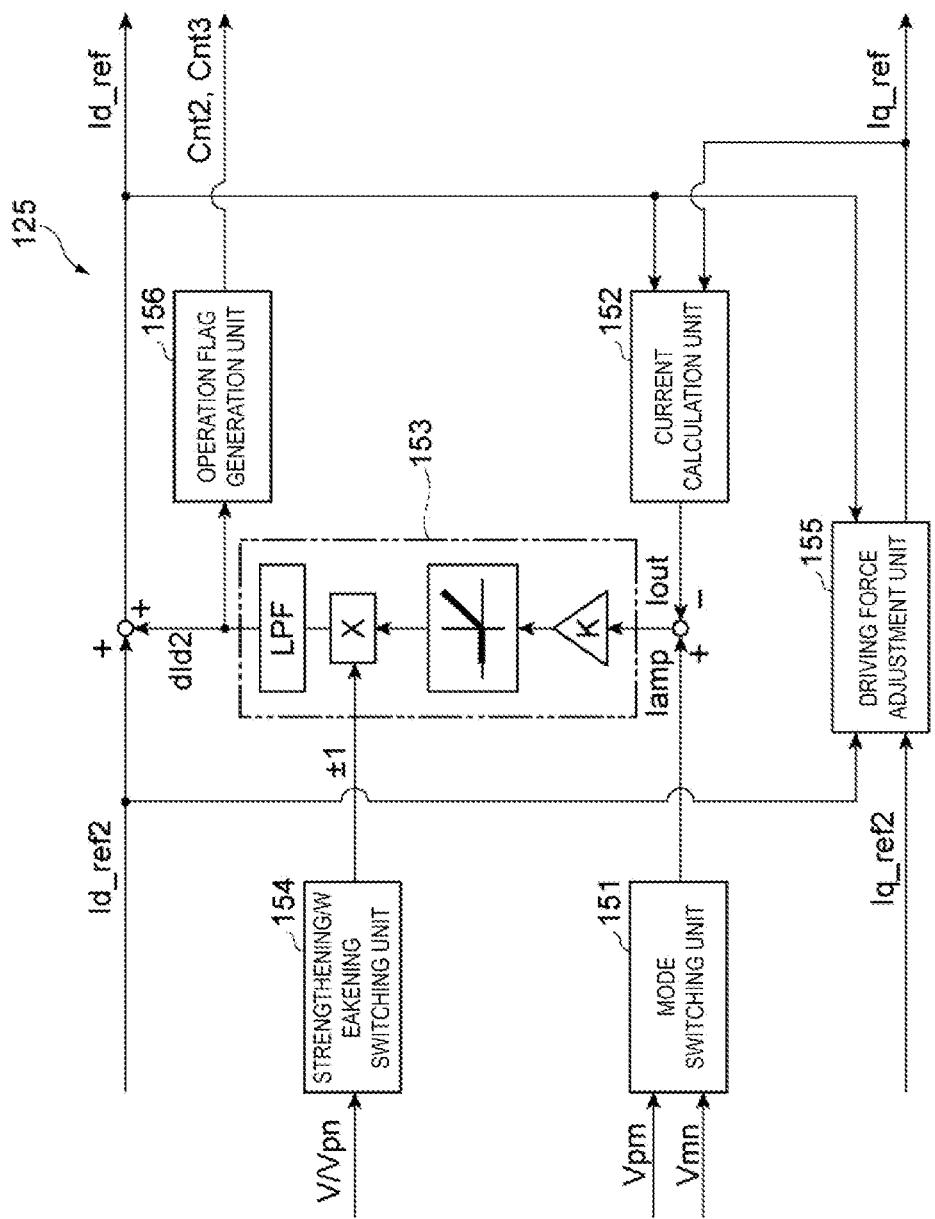

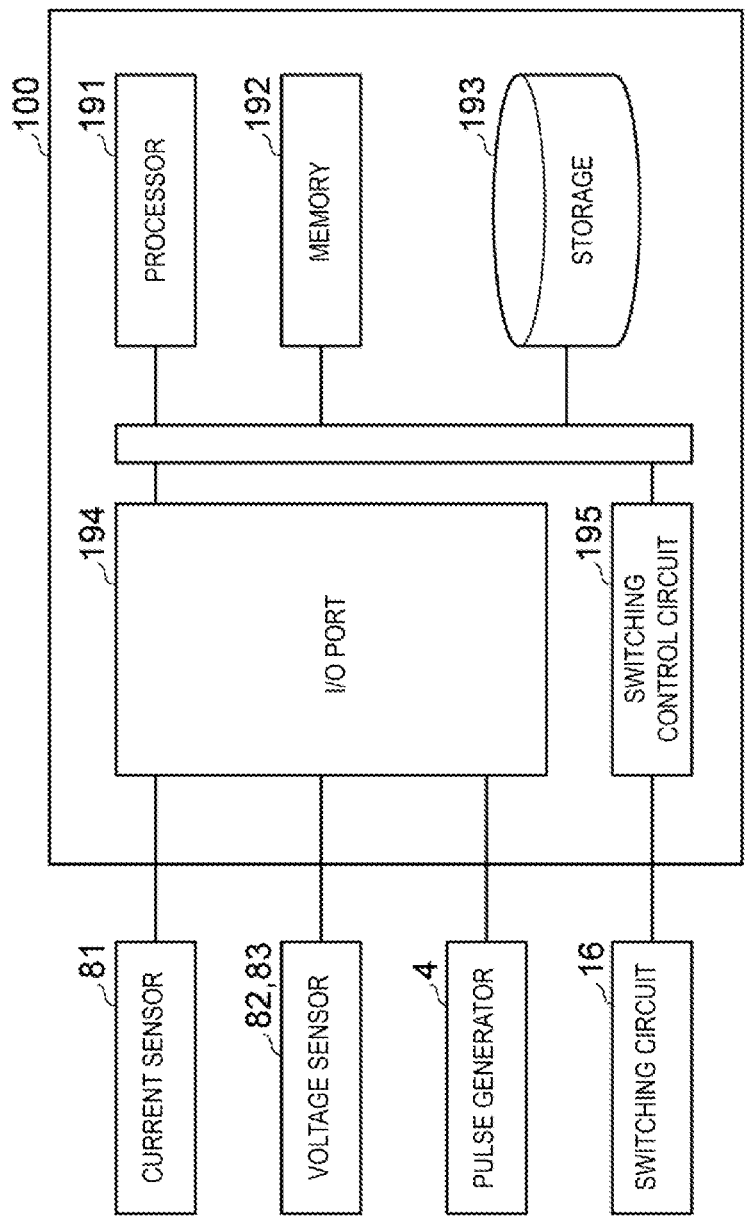

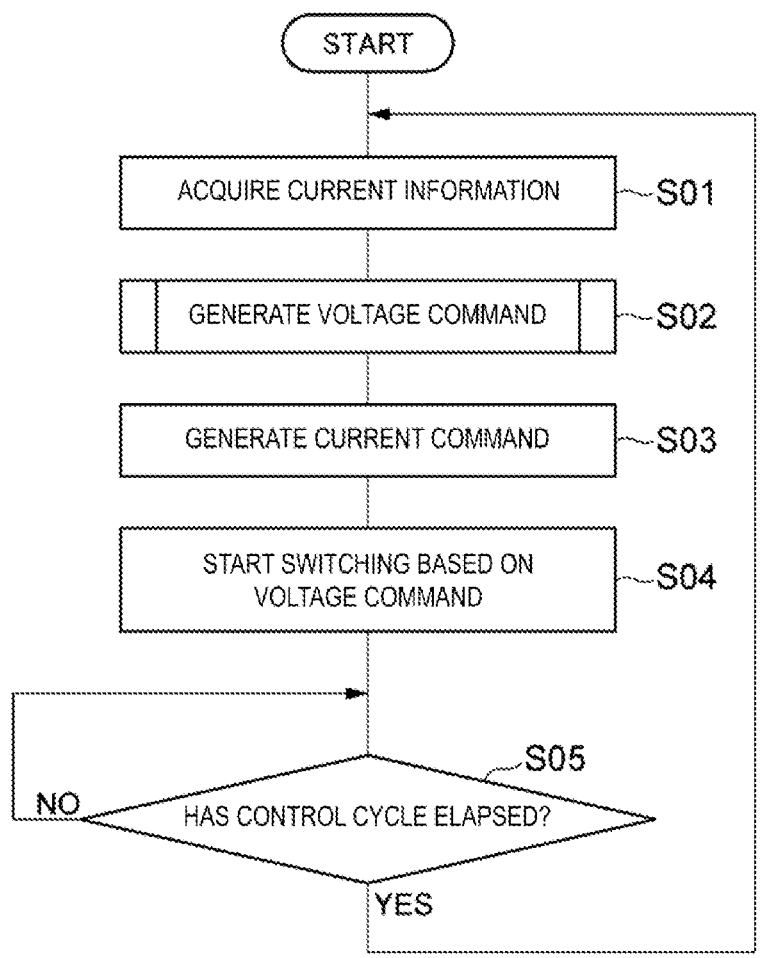
[FIG. 7]

[FIG. 8]
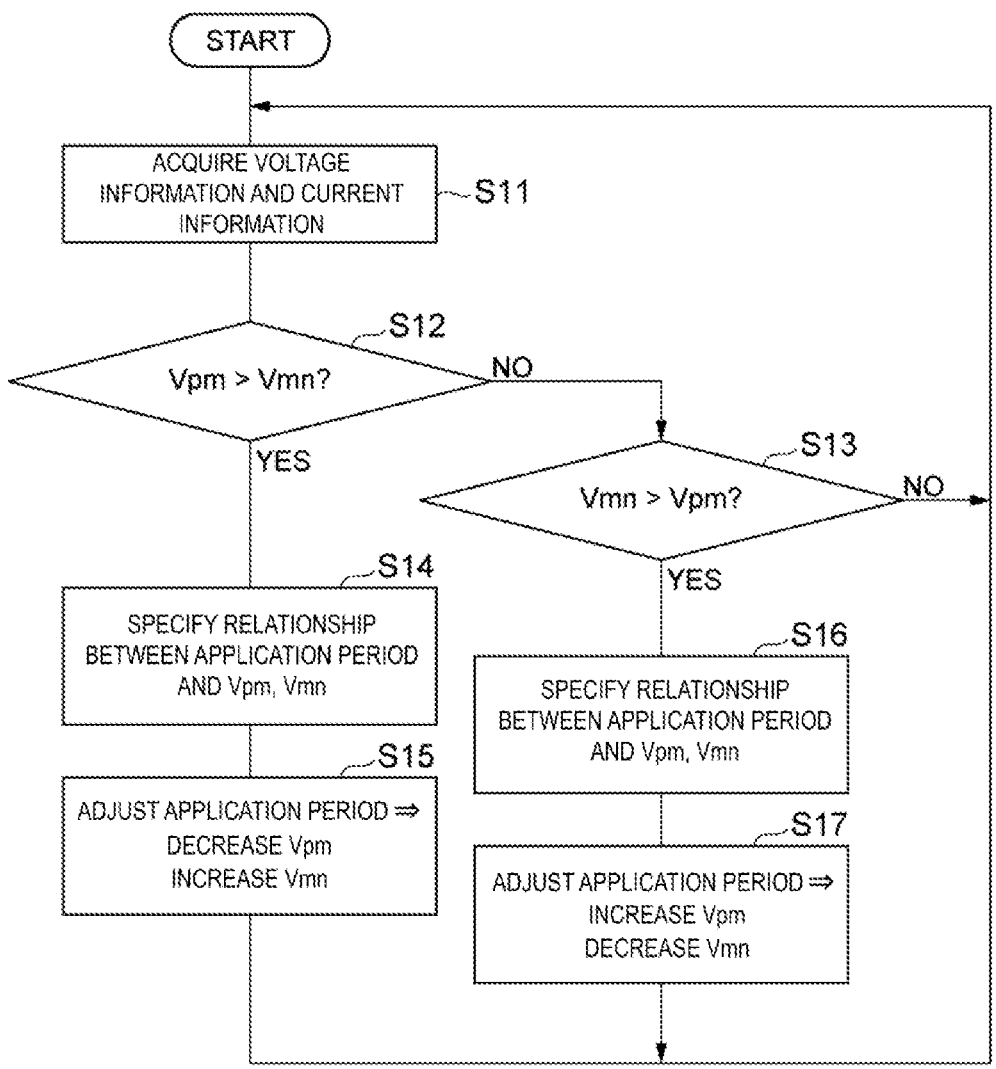

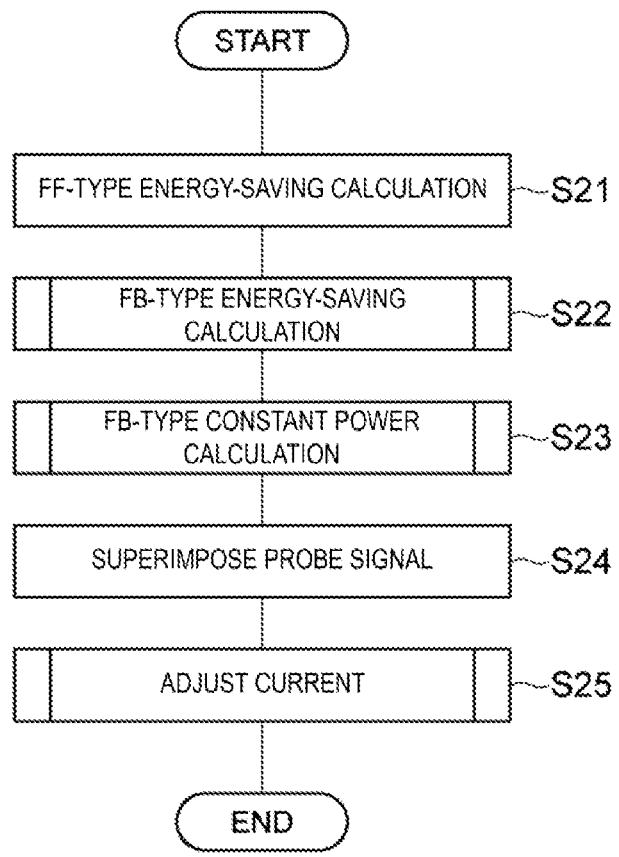

[FIG. 10]
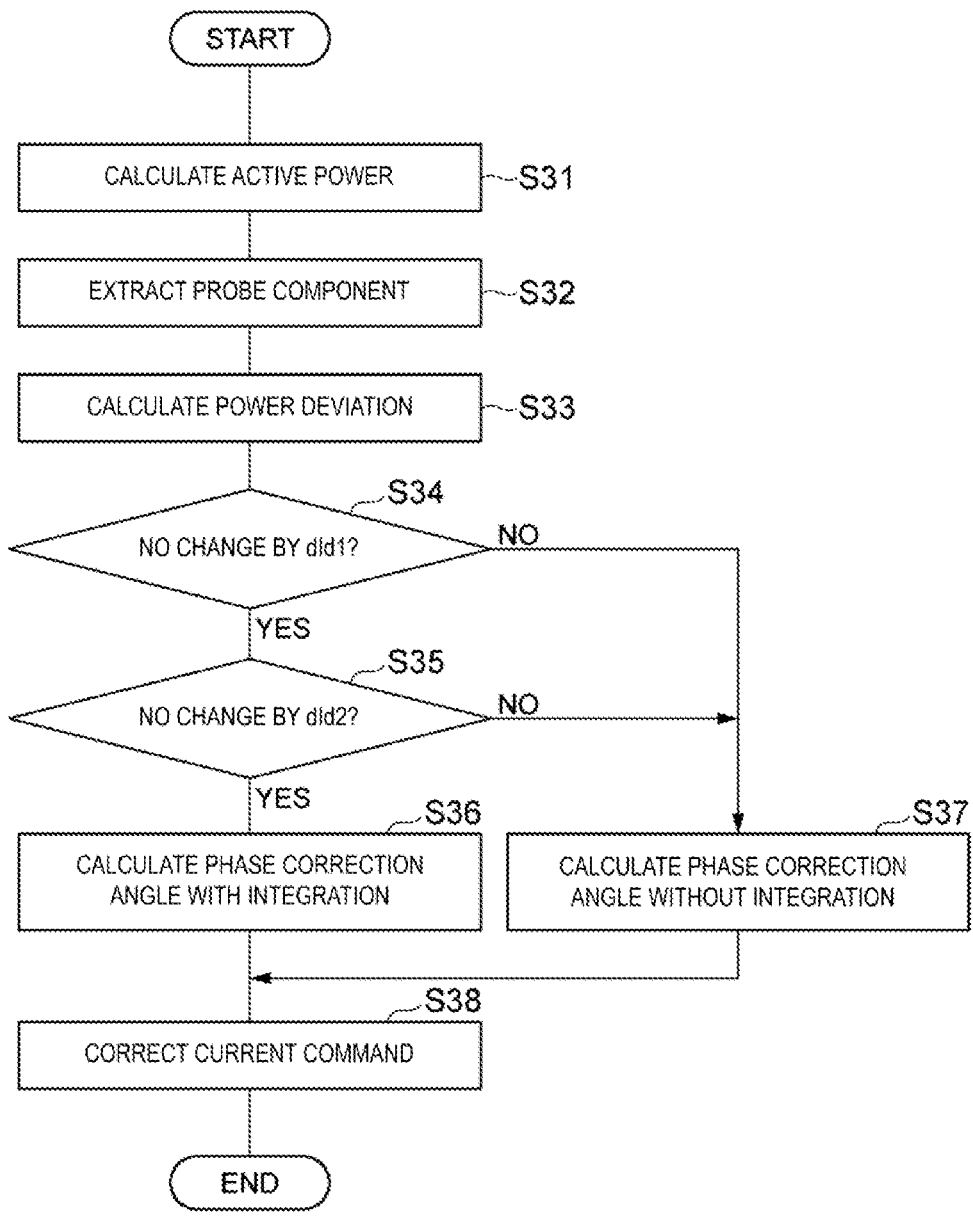

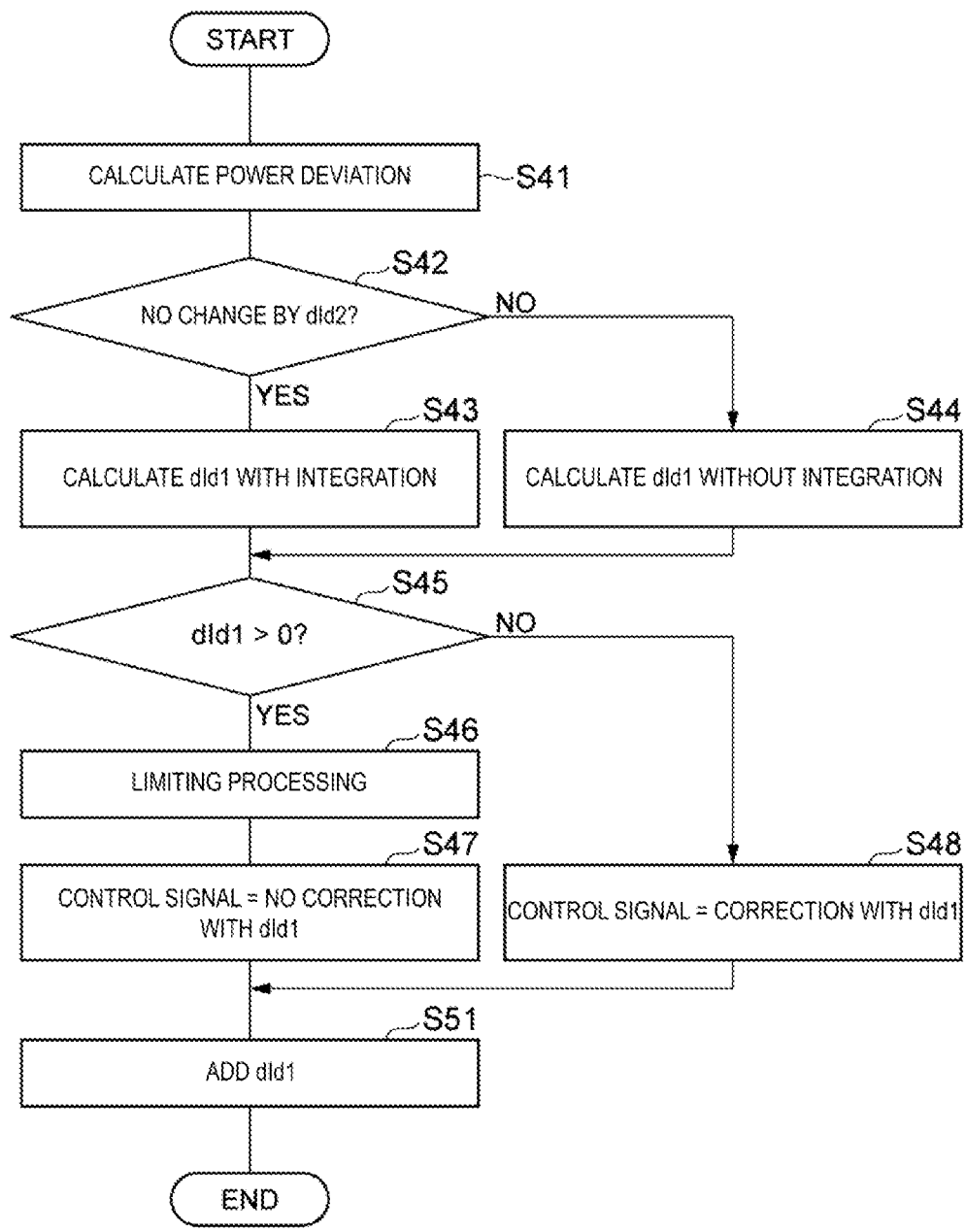
[FIG. 11]

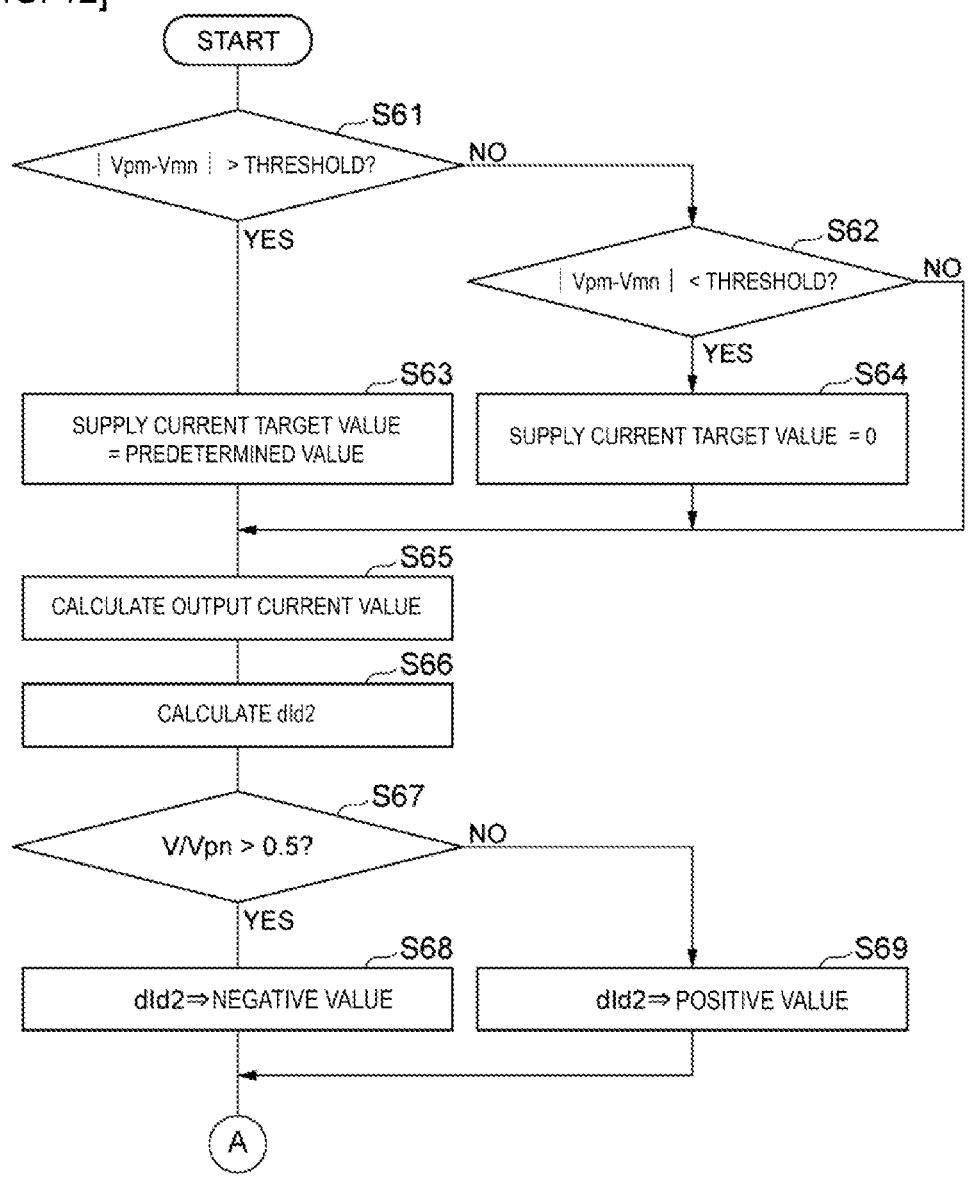
[FIG. 12]

[FIG. 13]
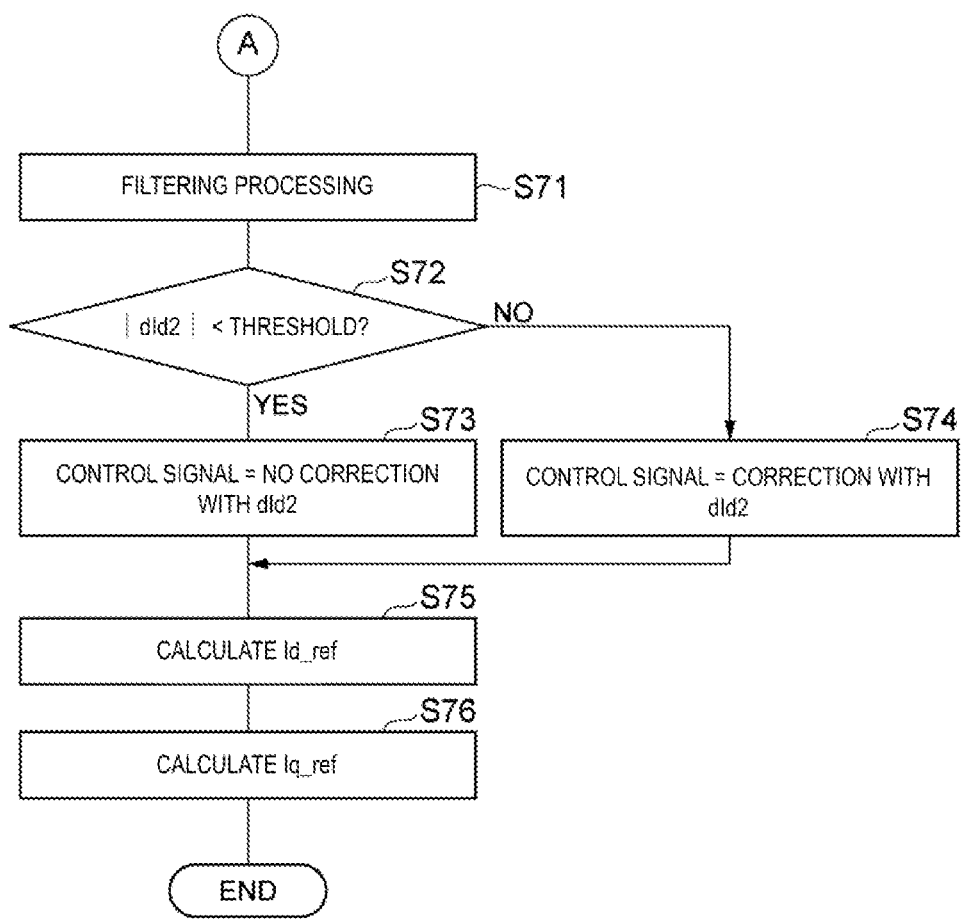

POWER CONVERSION DEVICE AND POWER CONVERSION METHOD

CROSS-REFERENCE TO RELATED DOCUMENTS

This application claims priority pursuant to 35 U.S.C. 119(a) to Japanese Application No. 2022-144051, filed Sep. 9, 2022, which application is incorporated herein by reference in its entirety.

TECHNICAL FIELD

The present disclosure relates to a power conversion device and a power conversion method.

BACKGROUND ART

Patent Document JP 3841254 B discloses a three-phase neutral point clamped PWM inverter. The three-phase neutral point clamped PWM inverter includes neutral point clamped PWM inverter legs for three phases. A leg of the neutral point clamped PWM inverter includes first and second switching elements connected in series between a positive bus and a phase voltage output terminal, and third and fourth switching elements connected in series between a negative bus and the phase voltage output terminal. A connection point between the first and second switching elements and a connection point between the third and fourth switching elements are both connected to a neutral line via respective clamping elements.

CITATION LIST

Patent Literature

Patent Document 1: JP 3841254 B

SUMMARY OF INVENTION

Technical Problem

The present disclosure provides a power conversion device that is effective for improving controllability of power in power conversion for multilevel voltage output.

Solution to Problem

A power conversion device according to one aspect of the present disclosure includes a switching circuit configured to supply a current to a motor by connecting and disconnecting a first point having a first potential, a second point having a second potential greater than the first potential, and a neutral point having a neutral potential between the first potential and the second potential to and from the motor, a neutral potential control unit configured to control the switching circuit in a manner to maintain the neutral potential within a target range, and a current control unit configured to increase a supply current to the motor without affecting a driving force generated by the motor at least when controlling the switching circuit by the neutral potential control unit.

A power conversion method according to another aspect of the present disclosure includes supplying a current to a motor by connecting and disconnecting a first point having a first potential, a second point having a second potential greater than the first potential, and a neutral point having a neutral potential between the first potential and the second potential to and from the motor by a switching circuit, performing the neutral potential control by controlling the switching circuit in a manner to maintain the neutral potential within a target range, and increasing a supply current to the motor without affecting a driving force generated by the motor at least when performing the neutral potential control.

Advantageous Effects of Invention

According to the present disclosure, a power conversion device that is effective for improving controllability of power in power conversion for multilevel voltage output can be provided.

BRIEF DESCRIPTION OF DRAWINGS

FIG. 1 is a schematic diagram illustrating a configuration example of a driving system.
FIG. 2 is a block diagram illustrating a configuration example of a current command generation unit.
FIG. 3 is a block diagram illustrating a configuration example of an FB-type energy saving calculation unit.
FIG. 4 is a block diagram illustrating a configuration example of an FB-type constant output calculation unit.
FIG. 5 is a block diagram illustrating a configuration example of a current adjustment unit.
FIG. 6 is a block diagram illustrating an example of a hardware configuration of a control circuit.
FIG. 7 is a flowchart illustrating an example of a power conversion control procedure.
FIG. 8 is a flowchart illustrating an example of a neutral potential control procedure.
FIG. 9 is a flowchart illustrating an example of a current command generation procedure.
FIG. 10 is a flowchart illustrating an example of an FB-type energy saving calculation procedure.
FIG. 11 is a flowchart illustrating an example of an FB-type constant output calculation procedure.
FIG. 12 is a flowchart illustrating an example of a current adjustment procedure.
FIG. 13 is a flowchart illustrating an example of a current adjustment procedure.

DESCRIPTION OF EMBODIMENTS

Hereinafter, an embodiment will be described in detail with reference to the drawings. In the description, elements which are the same or have the same function are given the same reference signs, and redundant descriptions thereof are omitted.

Driving System

A driving system 1 illustrated in FIG. 1 is a system that drives an object by a driving force generated by a motor 2. The driving system 1 includes a motor 2 and a power conversion device 3. The motor 2 generates the driving force in response to the supply of power. Examples of the motor 2 include synchronous motors such as a surface permanent magnet (SPM) motor, an interior permanent magnet (IPM) motor, and a synchronous reluctance motor. The motor 2 may be an induction motor. The motor 2 may include a pulse generator 4. The pulse generator 4 generates a pulse signal in response to the movement of the magnetic pole position (for example, rotation of the rotor). The power conversion device 3 converts primary power supplied from a power supply 9 into secondary power, and supplies the secondary power to the motor 2.

An example of the power supply 9 is a power system operated by a power company. The primary power and the secondary power may be alternating current (AC) power or may be direct current (DC) power. In the following, a configuration example in which both of the primary power and the secondary power are three-phase AC power is described.

As illustrated in FIG. 1, the power conversion device 3 includes a power conversion circuit 10 and a control circuit 100. The power conversion circuit 10 converts the primary power into the secondary power. The power conversion circuit 10 applies an AC voltage between phases on the secondary side by combining a first potential, a second potential greater than the first potential, and a neutral potential between the first potential and the second potential. Upon application of the AC voltage between the phases on the secondary side, an AC current is supplied to the motor 2.

For example, the power conversion circuit 10 includes a first point 11, a second point 12, a neutral point 13, a first capacitor 14, a second capacitor 15, and a switching circuit 16. The first point 11 has a first potential. The second point 12 has a second potential. The neutral point 13 has a neutral potential. The first capacitor 14 is connected to the first point 11 and the neutral point 13. The second capacitor 15 is connected to the second point 12 and the neutral point 13. The neutral potential of the neutral point 13 is determined by the relationship between the charge accumulated in the first capacitor 14 and the charge accumulated in the second capacitor 15. The switching circuit 16 supplies a current to the motor 2 by connecting and disconnecting each of the first point 11, the second point 12, and the neutral point 13 to and from the motor 2. Three levels of potentials including the first, second, and neutral potentials are combined. The power conversion circuit 10 having such a switching circuit may be referred to as a "neutral-point clamped inverter", a "three level inverter" or the like.

In an example, the power conversion circuit 10 includes input terminals 71R, 71S, 71T, output terminals 72U, 72V, 72W, a first circuit module 20, a first capacitor 14, a second capacitor 15, an inrush current limiter circuit 61, a second circuit module 40, a current sensor 81, and voltage sensors 82, 83. The input terminals 71R, 71S, 71T are respectively connected to three phases (for example, an R-phase, an S-phase, and a T-phase) of the power supply 9 (on the primary side). The output terminals 72U, 72V, 72W are respectively connected to three phases (for example, a U-phase, a V-phase, and a W-phase) of the motor 2 (on the secondary side).

The first circuit module 20 is an integrated circuit in which multiple semiconductor devices are combined into a single package with resin molding or the like, and includes primary-side terminals 24R, 24S, 24T, a rectifier circuit 21, primary-side DC terminals 25P, 25N, secondary-side DC terminals 26P, 26N, a switching circuit 22, a brake circuit 23, and secondary-side terminals 27U, 27V, 27W. The primary-side terminals 24R, 24S, 24T are connected to the input terminals 71R, 71S, 71T, respectively, outside the first circuit module 20, and each receive the primary-side three-phase alternating current from the power supply 9.

A rectifier circuit 21 is a diode bridge circuit composed of multiple diodes, converting a three-phase alternating current on the primary-side into a direct current and outputting the direct current to the primary-side direct current terminals 25P, 25N. The primary-side DC terminals 25P, 25N are connected to the secondary-side DC terminals 26P, 26N outside the first circuit module 20. Accordingly, the direct current output to the primary-side DC terminals 25P, 25N is input to the secondary-side DC terminals 26P, 26N. The second point 12 is formed between the primary-side DC terminal 25P and the secondary-side DC terminal 26P. The first point 11 is formed between the primary-side DC terminal 25N and the secondary-side DC terminal 26N.

The switching circuit 22 converts the direct current input to the secondary-side DC terminals 26P, 26N into a secondary-side three-phase AC current and outputs it to the secondary-side terminals 27U, 27V, 27W. For example, the switching circuit 22 includes arms 30U, 30V, 30W. The arm 30U switches the connection state between the secondary-side DC terminals 26P, 26N and the secondary-side terminal 27U to at least one of three states below. Positive electrode ON state: Pass the current from the secondary-side DC terminal 26P to the secondary-side terminal 27U, and block the current from the secondary-side terminal 27U to the secondary-side DC terminal 26N. Negative electrode ON state: Block the current from the secondary-side DC terminal 26P to the secondary-side terminal 27U, and pass the current from the secondary-side terminal 27U to the secondary-side DC terminal 26N. Both sides OFF state: Block both the current from the secondary-side DC terminal 26P to the secondary-side terminal 27U and the current from the secondary-side terminal 27U to the secondary-side DC terminal 26N.

For example, the arm 30U includes switching elements 31, 32 and diodes 33, 34. The switching element 31 is connected to the secondary-side DC terminal 26P and the secondary-side terminal 27U, and switches between an ON state in which the current flows from the secondary-side DC terminal 26P to the secondary-side terminal 27U and an OFF state in which the current from the secondary-side DC terminal 26P to the secondary-side terminal 27U is blocked. The diode 33 is connected in an anti-parallel manner to the switching element 31, allowing the current to flow from the secondary-side terminal 27U to the secondary-side DC terminal 26P and blocking the current from the secondary-side DC terminal 26P to the secondary-side terminal 27U. The diode 33 allows the current to flow constantly from the secondary-side terminals 27U to the secondary-side DC terminals 26P. The switching element 32 is connected to the secondary-side DC terminal 26N and the secondary-side terminal 27U, and switches between an ON state in which the current flows from the secondary-side DC terminals 27U to the secondary-side DC terminal 26N and an OFF state in which the current from the secondary-side terminal 27U to the secondary-side DC terminal 26N is blocked. The diode 34 is connected in an anti-parallel manner to the switching element 32, allowing the current to flow from the secondary-side DC terminals 26N to the secondary-side terminal 27U and blocking the current from the secondary-side terminal 27U to the secondary-side DC terminal 26N. The diode 34 allows the current to flow constantly from the secondary-side DC terminal 26N to the secondary-side terminal 27U.

When the switching element 31 is in the ON state and the switching element 32 is in the OFF state, the connection state between the secondary-side DC terminals 26P, 26N and the secondary-side terminal 27U is in the positive-side ON state. When the switching element 31 is in the OFF state and the switching element 32 is in the ON state, the connection state between the secondary-side DC terminals 26P, 26N and the secondary-side terminal 27U is in the negative-side ON state. When both of the switching elements 31, 32 are in the OFF state, the connection state between the secondary-side DC terminals 26P, 26N and the secondary-side terminal 27U is in both sides OFF state mentioned above.

The switching elements 31, 32 are, for example, a metal oxide semiconductor field effect transistor (power MOSFET), an insulated gate bipolar transistor (IGBT), or the like, which switches between the on and off states in response to a gate drive signal.

The arm 30V can be explained by replacing the secondary-side terminal 27U with the secondary-side terminal 27V in the description of the arm 30U. The arm 30W can be explained by replacing the secondary-side terminal 27U with the secondary-side terminal 27W in the description of the arm 30U. Thus, a detailed description of the arms 30V, 30W will be omitted.

The secondary-side terminals 27U, 27V, 27W are respectively connected to the output terminals 72U, 72V, 72W outside the first circuit module 20, thus supplying the secondary-side three-phase alternating current to the motor 2. The brake circuit 23 includes a diode and a resistor (not illustrated) connected in parallel to each other, and causes the resistor to consume regenerative power from the motor 2 to the secondary-side terminals 27U, 27V, 27W, as necessary.

The second capacitor 15 is connected to the neutral point 13 and to the second point 12 between the primary-side DC terminal 25P and the secondary-side DC terminal 26P. The first capacitor 14 is connected to the neutral point 13 and to the first point 11 between the primary-side DC terminal 25N and the secondary-side DC terminals 26N. The inrush current limiter circuit 61 includes, for example, a resistor and a relay connected in parallel to each other. By inserting the resistor between the primary-side DC terminal 25P and the second point 12, the flow of current from the primary-side DC terminals 25P to the first and second capacitors 14, 15 is limited, thus preventing the inrush current, when the power conversion device 3 is connected to the power supply 9 to turn on the power supply. In converting the primary power to the secondary power, the inrush current limiter circuit 61 short-circuits between the primary-side DC terminal 25P and the second point 12 at the contact point of the relay.

The second circuit module 40 is an integrated circuit in which multiple semiconductor devices are combined into a single package with resin molding or the like, and includes a primary-side terminal 41, secondary-side terminals 42U, 42V, 42W, and bidirectional arms 50U, 50V, 50W. The primary-side terminal 41 is connected to the neutral point 13 outside the second circuit module 40. The secondary-side terminals 42U, 42V, 42W are respectively connected to the output terminals 72U, 72V, 72W outside the second circuit module 40.

The bidirectional arm 50U switches the connection state between the primary-side terminal 41 and the secondary-side terminal 42U to at least one of two states below. Bidirectional ON state: Pass the current from the neutral point 13 to the secondary-side terminal 42U and from the secondary-side terminal 42U to the neutral point 13. Bidirectional OFF state: Block the current both from the neutral point 13 to the secondary-side terminal 42U and from the secondary-side terminal 42U to the neutral point 13.

For example, the bidirectional arm 50U includes switching elements 51, 52 and diodes 53, 54. The switching elements 51, 52 are connected in series between the primary-side terminal 41 and the secondary-side terminal 42U. The switching element 51 switches between the ON state in which the current flows from the primary-side terminal 41 to the secondary-side terminal 42U and the OFF state in which the current from the primary-side terminal 41 to the secondary-side terminal 42U is blocked. The switching element 52 switches between the ON state in which the current flows from the secondary-side terminal 42U to the primary-side terminal 41 and the OFF state in which the current from the secondary-side terminal 42U to the primary-side terminal 41 is blocked.

The diode 53 is connected in an anti-parallel manner to the switching element 51, allowing the current to flow from the secondary-side terminal 42U to the primary-side terminal 41 and blocking the current from the primary-side terminal 41 to the secondary-side terminal 42U. The diode 54 is connected in an anti-parallel manner to the switching element 52, allowing the current to flow from the primary-side terminal 41 to the secondary-side terminal 42U and blocking the current from the secondary-side terminal 42U to the primary-side terminal 41.

When both of the switching elements 51, 52 are in the ON state, the current flows from the primary-side terminal 41 to the secondary-side terminal 42U via the switching element 51 and the diode 54 and from the secondary-side terminal 42U to the primary-side terminal 41 via the switching element 52 and the diode 53. Thus, the connection state between the primary-side terminal 41 and the secondary-side terminal 42U is in the bidirectional ON state mentioned above. When both of the switching elements 51, 52 are in the OFF state, the current from the primary-side terminal 41 to the secondary-side terminal 42U is blocked by the switching element 51 and the diode 53, and the current from the secondary-side terminal 42U to the primary-side terminal 41 is blocked by the switching element 52 and the diode 54. Thus, the connection state between the primary-side terminal 41 and the secondary-side terminal 42U is in the bidirectional OFF state.

The switching elements 51, 52 are, for example, the power MOSFETs, the IGBTs, or the like that switch between the ON state and the OFF state according to a gate drive signal. The bidirectional arms may be composed of RG-IGBTs connected in an anti-parallel manner to each other.

The bidirectional arm 50V can be explained by replacing the secondary-side terminal 42U in the description of the bidirectional arm 50U with the secondary-side terminal 42V. The bidirectional arm 50W can be explained by replacing the secondary-side terminal 42U in the description of the bidirectional arm 50U with the secondary-side terminal 42W. Therefore, a detailed description of the bidirectional arms 50V 50W will be omitted.

The switching circuit 22 of the first circuit module 20 and the bidirectional arms 50U, 50V, 50W of the second circuit module 40 constitute the switching circuit 16 described above. For example, the switching circuit 16 sets the arm 30U to the positive-side ON state and sets the bidirectional arm 50U to the bidirectional OFF state, thus setting the output terminal 72U to the second potential. The switching circuit 16 sets the arm 30U to the negative-side ON state and sets the bidirectional arm 50U to the bidirectional OFF state, thus setting the output terminal 72U to the first potential. The switching circuit 16 sets the arm 30U to the both-side OFF state and sets the bidirectional arm 50U to the bidirectional ON state, thus setting the output terminal 72U to the neutral potential.

The function of the switching circuit 16 for the output terminal 72V can be explained by replacing the arm 30U with the arm 30V, replacing the bidirectional arm 50U with the bidirectional arm 50V, and replacing the output terminal 72U with the output terminal 72V in the description of the function of the switching circuit 16 for the output terminal 72U. The function of the switching circuit 16 for the output terminal 72W can be explained by replacing the arm 30U with the arm 30W, replacing the bidirectional arm 50U with the bidirectional arm 50W, and replacing the output terminal 72U with the output terminal 72W in the description of the function of the switching circuit 16 for the output terminal 72U.

The current sensor 81 detects a secondary-side current (supply current supplied from the switching circuit 16 to the motor 2) flowing through the output terminals 72U, 72V, 72W. For example, the current sensor 81 may be configured to detect the current at each of the output terminals 72U, 72V, 72W, or to detect the current of any two phases of the output terminals 72U, 72V, 72W. Since a total current flowing through the output terminals 72U, 72V, 72W is zero, as long as no zero-phase current is generated, information about the current of all phases is obtained even when the two phase current is detected. The voltage sensor 82 detects a potential difference between the second point 12 and the neutral point 13. The voltage sensor 83 detects a potential difference between the neutral point 13 and the first point 11.

The detection result by the voltage sensors 82, 83 represents the neutral potential of the neutral point 13. For example, half of the difference between the detection result by the voltage sensor 82 and the detection result by the voltage sensor 83 corresponds to a difference between the neutral potential and an average potential of the first and second potentials.

The configuration of the power conversion circuit 10 described above is merely an example. The configuration of the power conversion circuit 10 can be appropriately changed as long as a current is supplied to the motor by connecting and disconnecting each of the first point having the first potential, the second point having the second potential, and the neutral point having the neutral potential to and from the motor. For example, the rectifier circuit 21 and the switching circuit 22 may be provided as separate modules. The switching circuit 22 may be provided as a module separate from the rectifier circuit 21 and the brake circuit 23. When the primary power is DC power such as from a storage battery or the like, the rectifier circuit 21 and the brake circuit 23 may be omitted, and the switching circuit 22 may be modularized independently. In the drawing, the internal bidirectional arms 50U, 50V, 50W are formed by series connection in which collectors and cathodes are connected to each other. Alternatively, the bidirectional arms 50U, 50V, 50W may be formed by series connection in which emitters and anodes, or sources in the case of MOS-FETs, are connected to each other, or may be formed by anti-parallel connection of RB-IGBTs. Each of the bidirectional arms 50U, 50V, 50W may be divided into individual modules, or may be formed using discrete components such as IGBTs, RG-IGBTs, MOS-FETs, and diodes.

The control circuit 100 uses a combination of the first potential, the second potential, and the neutral potential to control the power conversion circuit 10 so as to apply an AC voltage between the phases on the secondary side. For example, when the magnitude of a voltage command is less than a predetermined reference value, the control circuit 100 applies a voltage between any two phases on the secondary side using a combination of the same potentials, a combination of the first potential and the neutral potential, or a combination of the second potential and the neutral potential. For example, the control circuit 100 controls the switching circuit 16 so as to repeat a switching pattern, the switching pattern including a zero potential period in which zero voltage corresponding to equivalent potentials is applied between phases, a first period in which a voltage corresponding to a difference between the neutral potential and the first potential is applied between phases, and a second period in which a voltage corresponding to a difference between the second potential and the neutral potential is applied between phases. However, the switching pattern does not include a third period in which a voltage corresponding to the difference between the second potential and the first potential is applied between phases, nor a fourth period in which the first potential, the second potential, and the neutral potential are applied to the respective phases.

When the magnitude of the voltage command is greater than the reference value, the control circuit 100 applies a voltage between at least any two phases on the secondary side using a combination of the first potential and the second potential. For example, the control circuit 100 controls the switching circuit 16 so as to repeat a switching pattern including the third period and the fourth period in addition to the first period and the second period.

As described above, in the configuration in which the AC voltage is applied between the phases by the neutral potential in addition to the first potential and the second potential, stabilization of the neutral potential is required to improve the controllability of the electric power. As described above, the neutral potential of the neutral point 13 is determined by the relationship between the charge accumulated in the first capacitor 14 and the charge accumulated in the second capacitor 15. Therefore, the relationship between the charge accumulated in the first capacitor 14 and the charge accumulated in the second capacitor 15 can be adjusted by, for example, the relationship between the length of the first period during which the voltage corresponding to the difference between the neutral potential and the first potential is applied between phases and the length of the second period during which the voltage corresponding to the difference between the second potential and the neutral potential is applied between phases.

However, in a case of a less current output to the motor to generate the driving force (for example, during no-load operation), even when the relationship between the length of the first period and the length of the second period is changed, the charge of the first capacitor 14 and the charge of the second capacitor 15 are unlikely to increase or decrease, and thus the neutral potential is unlikely to change. Therefore, the control circuit 100 is configured to perform the neutral potential control for controlling the switching circuit 16 so as to maintain the neutral potential within the target range, and to increase the supply current to the motor 2 in a manner not to affect the driving force generated by the motor 2 at least when performing the neutral potential control.

With this configuration, even when the driving force generated by the motor 2 is less, the supply current to the motor is maintained at the lower limit current level or greater. This facilitate the change of the neutral potential under the control of the switching circuit 16. The situation in which the change of the neutral potential during no-load operation or the like may occur particularly in a synchronous motor, but may also occur in a high-efficiency induction motor or the like.

For example, the control circuit 100 includes a neutral potential control unit 111 and a current control unit 112 as functional elements (hereinafter referred to as "functional blocks"). The neutral potential control unit 111 repeatedly performs the neutral potential control described above. For example, the neutral potential control unit 111 maintains the neutral potential within the target range by changing the relationship between the length of the period during which the switching circuit 16 causes the current to flow between the first capacitor 14 and the motor 2 and the length of the period during which the switching circuit 16 causes the current to flow between the second capacitor 15 and the motor 2. The neutral potential may also be maintained within the target range by the switching circuit 16 by applying the first potential, the second potential, and the neutral potential to respective phases and changing the length of the period to flow current between the first and second capacitors 14, 15 and the motor 2. The target range includes an average potential of the first potential and the second potential. For example, the target range is a range having a predetermined extent around the average potential.

In an example, the neutral potential control unit 111 maintains the neutral potential within the target range by changing the relationship between the length of the first period and the length of the second period in the switching pattern described above. The relationship between the length of the first period and the length of the second period in order to maintain the neutral potential within the target range also changes depending on the direction of the supply current. Therefore, the neutral potential control unit 111 may change the relationship between the length of the first period and the length of the second period based on the supply direction of the supply current and the neutral potential so as to maintain the neutral potential within the target range.

For example, the neutral potential control unit 111 calculates the supply direction of the supply current based on the detection result of the current sensor 81, calculates the neutral potential based on the detection result of the voltage sensors 82, 83, and changes the relationship between the length of the first period and the length of the second period based on the calculated supply direction and the calculated neutral potential so as to maintain the neutral potential within the target range.

At least when the neutral potential control unit 111 controls the switching circuit 16 (when controlling the neutral potential), the current control unit 112 increases the supply current to the motor 2 so as not to affect the driving force generated by the motor 2, and controls the switching circuit 16 so as to maintain the magnitude of the supply current at a predetermined lower limit current level or greater. For example, the current control unit 112 increases the supply current to the motor 2 so as not to affect the driving force generated by the motor 2, changes the current command so as to maintain the magnitude of the supply current at a predetermined lower limit current level or greater, and controls the switching circuit 16 so as to allow the supply current to correspond to the changed current command.

The lower limit current level is, for example, a numerical value representing a lower limit of the magnitude of the current (the length of the current vector or the amplitude of the current). For example, the lower limit current level is predetermined to a magnitude required for control of maintaining the neutral potential within the target range. The magnitude required for the control of maintaining the neutral potential within the target range is set to, for example, a value obtained by multiplying the rated current of the motor 2 by a predetermined ratio (for example, from a few to several tens of percent). The control circuit 100 may be configured such that a user can arbitrarily set the lower limit current level.

For example, the current control unit 112 includes, as functional blocks, a current command generation unit 113, a magnetic pole position detection unit 116, a coordinate conversion unit 117, a voltage command generation unit 114, and a PWM control unit 115. The current command generation unit 113 generates a current command mentioned above.

For example, the current command generation unit 113 repeatedly generates a d-axis current command Id_ref and a q-axis current command Iq_ref in the rotating coordinate system at a predetermined control cycle. The rotating coordinate system is a coordinate system having a d-axis and a q-axis, which rotates with the movement of the magnetic pole position. The d-axis is the coordinate axis along the direction to the magnetic pole position, and the q-axis is the coordinate axis perpendicular to the d-axis. The d-axis current command Id_ref is a command for the d-axis current, and the q-axis current command Iq_ref is a command for the q-axis current. The d-axis current is a current that generates magnetic flux by the motor 2 along the d-axis, and the q-axis current is a current that generates magnetic flux by the motor 2 along the q-axis.

In an example, the current command generation unit 113 generates the d-axis current command Id_ref and the q-axis current command Iq_ref so as to cause the motor 2 to generate a driving force (for example, torque) corresponding to a target driving force (for example, target torque T_ref). A method for generating the d-axis current command Id_ref and the q-axis current command Iq_ref by the current command generation unit 113 will be described later.

The magnetic pole position detection unit 116 detects a magnetic pole position θ of the motor 2. The magnetic pole position θ is represented by, for example, a phase angle (electrical angle) in the magnetic pole direction in a fixed coordinate system. For example, the magnetic pole position detection unit 116 detects the magnetic pole position θ based on the pulse signal generated by the pulse generator 4. In a case in which the motor 2 does not include the pulse generator 4, the magnetic pole position detection unit 116 may estimate the magnetic pole position θ based on the voltage applied to the motor 2, the current flowing through the motor 2, and the like.

The coordinate conversion unit 117 performs coordinate conversion on the phase currents Iu, Iv, Iw detected by the current sensor 81 to calculate a d-axis current Id and a q-axis current Iq.

The voltage command generation unit 114 generates a voltage command to cause the supply current to correspond to the current command. For example, every time the d-axis current command Id_ref and the q-axis current command Iq_ref are calculated by the current command generation unit 113, the voltage command generation unit 114 calculates a d-axis voltage command Vd_ref and a q-axis voltage command Vq_ref so as to reduce the deviation between the d-axis current command Id_ref and the d-axis current Id and the deviation between the q-axis current command Iq_ref and the q-axis current Iq. The d-axis voltage command Vd_ref is a command for the d-axis voltage, and the q-axis voltage command Vq_ref is a command for the q-axis voltage. The d-axis voltage is a voltage applied in the same direction as the d-axis current, and the q-axis voltage is a voltage applied in the same direction as the q-axis current.

The PWM control unit 115 controls the switching circuit 16 to apply the voltage corresponding to the voltage command to the motor 2. For example, every time the d-axis voltage command Vd_ref and the q-axis voltage command Vq_ref are calculated, the PWM control unit 115 calculates the above-described switching pattern so as to apply the voltage corresponding to the d-axis voltage command Vd_ref and the q-axis voltage command Vq_ref to the motor 2, and repeats the switching pattern, thus controlling the switching circuit 16. Thus, the switching circuit 16 is controlled to cause the supply current to correspond to the d-axis current command Id_ref and the q-axis current command Iq_ref.

The neutral potential control unit 111 described above changes the relationship between the length of the first period and the length of the second period in the switching pattern calculated by the PWM control unit 115. For example, the neutral potential control unit 111 changes the relationship between the length of the first period and the length of the second period without changing the total length of the first period and second period.

In such a configuration of the current control unit 112, at least when the neutral potential control unit 111 controls the switching circuit 16, the current command generation unit 113 increases the supply current to the motor 2 so as not to affect the driving force generated by the motor 2, and calculates the current command so as to maintain the magnitude of the supply current at a predetermined lower limit current level or greater. For example, the current command generation unit 113 increases the supply current along a constant torque curve within the range of the maximum current that the switching circuit 16 can supply to the secondary side. The constant torque curve is a curve representing the relationship between the d-axis current Id and the q-axis current Iq in the rotating coordinate system when the driving force is kept constant.

For example, the current command generation unit 113 calculates a first current command corresponding to the magnetic pole direction of the motor 2 such that the magnitude of the supply current is equal to or greater than the lower limit current level, and calculates a second current command corresponding to a direction perpendicular to the magnetic pole direction based on the first current command so that the motor 2 generates a driving force corresponding to the target driving force. In an example, the current command generation unit 113 calculates the d-axis current command Id_ref such that the magnitude of the supply current is equal to or greater than the lower limit current level, and calculates the q-axis current command Iq_ref based on the d-axis current command Id_ref such that the motor 2 generates the driving force corresponding to the target driving force.

The current command generation unit 113 may include a first calculation unit that calculates the current command so as to cause the motor 2 to generate the driving force corresponding to the target driving force, while reducing the deviation between the predetermined control target value and the predetermined value to be controlled, and a second calculation unit that increases the supply current so as not to affect the driving force and corrects the current command so as to maintain the magnitude of the supply current at a predetermined lower limit current level or greater when the neutral potential control unit 111 performs the neutral potential control.

When the current command is not corrected by the second calculation unit, the first calculation unit may integrate the deviation and calculate the current command based on the deviation and an integration result of the deviation. When the current command is corrected by the second calculation unit, the first calculation unit may stop integration of the deviation and calculate the current command based on the deviation.

FIG. 2 is a block diagram illustrating a configuration example of the current command generation unit 113. The current command generation unit 113 illustrated in FIG. 2 includes an FF-type energy saving calculation unit 121, an FB-type energy saving calculation unit 122, a probe signal superimposing unit 124, an FB-type constant output calculation unit 123, and a current adjustment unit 125. The FB-type energy saving calculation unit 122 is an example of the first calculation unit mentioned above, and the FB-type constant output calculation unit 123 is also an example of the first calculation unit mentioned above. The current adjustment unit 125 is an example of the second calculation unit.

The FF-type energy saving calculation unit 121 calculates current commands (for example, a d-axis current command Id_ref0 and a q-axis current command Iq_ref0) so as to minimize the supply current for causing the motor 2 to generate a driving force (for example, torque) corresponding to a target driving force (for example, target torque T_ref). For example, the FF-type energy saving calculation unit 121 calculates the d-axis current command Id_ref0 based on a torque-current profile, which is generated in advance to represent the relationship between the target torque T_ref and the d-axis current command Id_ref0, and the present value of the target torque T_ref, and calculates the q-axis current command Iq_ref0 based on the target torque T_ref and the d-axis current command Id_ref0. The torque-current profile is generated by simulation, actual machine test, or the like.

The FB-type energy saving calculation unit 122 corrects the d-axis current command Id_ref0 and the q-axis current command Iq_ref0 so as to minimize the supply current with respect to the target torque T_ref based on a feedback value indicating whether or not the supply current is minimized with respect to the target torque T_ref, and calculates the d-axis current command Id_ref1 and the q-axis current command Iq_ref1. For example, the FB-type energy saving calculation unit 122 acquires, as the feedback value, the fluctuation occurring in power corresponding to the phase fluctuation when the current phase (the phase angle of the current vector represented by the d-axis current Id and the q-axis current Iq in the rotating coordinate system) is varied while suppressing the fluctuation of the driving force. Hereinafter, the fluctuation occurring in power corresponding to the phase fluctuation of the current is simply referred to as "power fluctuation". The FB-type energy saving calculation unit 122 changes the phase angle of the d-axis current command Id_ref0 and the q-axis current command Iq_ref0 such that the power fluctuation approaches zero, and calculates the phase angle of the d-axis current command Id_ref1 and the q-axis current command Iq_ref1. Details of the FB-type energy saving calculation performed by the FB-type energy saving calculation unit 122 are also described in, for example, JP 5526975 B.

For example, as illustrated in FIG. 3, the FB-type energy saving calculation unit 122 includes, as functional blocks, an active power calculation unit 131, a probe component extraction unit 132, a correction angle calculation unit 133, and a current correction unit 134. The active power calculation unit 131 calculates an active power P supplied from the switching circuit 16 to the motor 2 based on the current in the fixed coordinate system and the voltage command in the fixed coordinate system.

The fixed coordinate system has an α-axis and a β-axis. The α-axis is, for example, a coordinate axis aligned with the direction of any one phase on the secondary side, and the β-axis is a coordinate axis perpendicular to the α-axis. The current in the fixed coordinate system includes an α-axis current Iα corresponding to the α-axis and a β-axis current Iβ corresponding to the β-axis. The voltage in the fixed coordinate system includes an α-axis voltage Vα corresponding to the α-axis and a β-axis voltage Vβ corresponding to the β-axis. For example, the α-axis current Iα and the β-axis current Iβ are calculated by the coordinate conversion unit 117 based on the phase current Iu, Iv, Iw (see FIG. 2). The α-axis voltage Vα and the β-axis voltage Vβ are calculated by the coordinate conversion unit 117 based on, for example, the d-axis voltage command Vd_ref and the q-axis voltage command Vq_ref.

The probe component extraction unit 132 extracts a power fluctuation P0 corresponding to the above-described phase fluctuation from the active power P. The correction angle calculation unit 133 calculates a phase correction angle θadj for the d-axis current command Id_ref0 and the q-axis current command Iq_ref0 based on a deviation between the power fluctuation P0 and a predetermined fluctuation target value P_ref (for example, zero). The power fluctuation P0 is an example of the value to be controlled in the first calculation unit, and the fluctuation target value P_ref is an example of the control target value in the first calculation unit. The correction angle calculation unit 133 integrates the deviation between the power fluctuation P0 and the fluctuation target value P_ref, and calculates the phase-correction angle θadj based on the deviation and the integration result of the deviation. The current correction unit 134 corrects the phase angle of the d-axis current command Id_ref0 and the q-axis current command Iq_ref0 with the phase correction angle θadj, and calculates the d-axis current command Id_ref1 and the q-axis current command Iq_ref1.

Referring back to FIG. 2, the FB-type constant output calculation unit 123 calculates a current command so that the motor 2 generates a torque corresponding to the target torque T_ref while maintaining the voltage applied from the switching circuit 16 to the motor 2 at a predetermined upper limit voltage level. For example, when the voltage command value V_ref representing the magnitude of the voltage command (a root sum square of the d-axis voltage command Vd_ref and the q-axis voltage command Vq_ref) exceeds the upper limit voltage value V_lim, the FB-type constant output calculation unit 123 calculates the d-axis current correction value dId1 so as to bring the voltage command value V_ref to approach to the upper limit voltage value V_lim, and adds the d-axis current correction value dId1 to the d-axis current command Id_ref1.

The d-axis current command Id_ref1 is changed by the addition of the d-axis current correction value dId1, and this allows calculation of the q-axis current command Iq_ref by the current adjustment unit 125 described later such that the torque does not deviate from the target torque T_ref. Thus, the FB-type constant output calculation unit 123 calculates the d-axis current correction value dId1 such that the voltage command value V_ref is equal to or less than the upper limit voltage value V_lim, and adds the d-axis current correction value dId1 to the d-axis current command Id_ref1, to calculate the current command. Accordingly, the motor 2 generates the torque corresponding to the target torque T_ref, while maintaining the voltage command value V_ref in the vicinity of the upper limit voltage value V_lim (upper limit voltage level). In a case of performing the speed control by a speed control unit (not illustrated), the target torque T_ref output from the speed control unit may be adjusted such that the speed of the motor 2 does not deviate from the speed command even when the d-axis current command Id_ref1 is changed by the addition of the d-axis current correction value dId1.

For example, as illustrated in FIG. 4, the FB-type constant output calculation unit 123 includes a current correction value calculation unit 141 and a limiter 142 as functional blocks. The current correction value calculation unit 141 integrates a deviation between the upper limit voltage value V_lim and the voltage command value V_ref, and calculates the d-axis current correction value dId1 based on the deviation and an integration result of the deviation. The limiter 142 performs limiting processing to limit the d-axis current correction value dId1 to zero or less. Therefore, when the voltage command value V_ref is less than the upper limit voltage value V_lim, the d-axis current correction value dId1 becomes zero, and the d-axis current command Id_ref1 is not changed by the FB-type constant output calculation unit 123. The voltage command value V_ref is an example of the value to be controlled in the first calculation unit, and the upper limit voltage value V_lim is an example of the control target value in the first calculation unit.

The limiter 142 adds the limited d-axis current correction value dId1 to the d-axis current command Id_ref1. The limiter 142 also outputs a control signal Cnt1 indicating whether or not the d-axis current command Id_ref1 is changed by the FB-type constant output calculation unit 123 to the FB-type energy saving calculation unit 122. For example, the limiter 142 outputs a signal indicating whether or not the d-axis current compensation value dId1 is zero to the FB-type energy saving calculation unit 122 (see FIG. 2). When recognizing that the d-axis current command Id_ref1 is changed by the FB-type constant output calculation unit 123 based on the control signal Cnt1, the correction angle calculation unit 133 of the FB-type energy saving calculation unit 122 stops integration of the deviation between the power fluctuation P0 and the fluctuation target value P_ref, and calculates the phase correction angle θadj based on the deviation.

Referring back to FIG. 2, the probe signal superimposing unit 124 calculates the d-axis current command Id_ref2 and the q-axis current command Iq_ref2 by superimposing the probe signal on the d-axis current command Id_ref1 (the d-axis current command Id_ref1 to which the d-axis current correction value dId1 is added) and the q-axis current command Iq_ref1 so as to generate the above-described phase fluctuation in the d-axis current command Id_ref1 and the q-axis current command Iq_ref1.

When at least the neutral potential control unit 111 controls the switching circuit 16, the current adjustment unit 125 increases the supply current to the motor 2 so as not to affect the driving force generated by the motor 2, and calculates a current command so as to maintain the magnitude of the supply current at the predetermined lower limit current level or greater. In an example, the current adjustment unit 125 calculates the d-axis current command Id_ref by changing the magnitude of the d-axis current command Id_ref2 such that the magnitude of the supply current is equal to or greater than the lower limit current level, and calculates the q-axis current command Iq_ref based on the d-axis current command Id_ref such that the motor 2 generates the torque corresponding to the target torque T_ref.

The current adjustment unit 125 outputs control signals Cnt2, Cnt3 indicating whether or not to change the magnitude of the d-axis current command Id_ref2 to the FB-type energy saving calculation unit 122 and the FB-type constant output calculation unit 123, respectively. When recognizing that the d-axis current command Id_ref2 is changed by the current adjustment unit 125 based on the control signal Cnt2, the correction angle calculation unit 133 of the FB-type energy saving calculation unit 122 stops integration of the deviation between the power fluctuation P0 and the fluctuation target value P_ref, and calculates the phase correction angle θadj based on the deviation. When recognizing that the d-axis current command Id_ref2 is changed by the current adjustment unit 125 based on the control signal Cnt3, the current correction value calculation unit 141 of the FB-type constant output calculation unit 123 stops integration of the deviation between the upper limit voltage value V_lim and the voltage command value V_ref, and calculates the d-axis current correction value dId1 based on the deviation.

For example, as illustrated in FIG. 5, the current adjustment unit 125 includes, as functional blocks, a mode switching unit 151, a current calculation unit 152, a current adjustment value calculation unit 153, a strengthening/weakening switching unit 154, a driving force adjustment unit 155, and an operation flag generation unit 156. The mode switching unit 151 switches between a first control mode in which the control for maintaining the magnitude of the supply current at the lower limit current level or greater is performed and a second control mode in which the control for maintaining the magnitude of the supply current at the lower limit current level or greater is not performed, based on the magnitude of the fluctuation of the neutral potential. For example, the mode switching unit 151 evaluates the magnitude of a difference between the average potential of the first and second potentials and the neutral potential (the fluctuation of the neutral potential from the average potential) based on the difference between the detection result by the voltage sensor 82 and the detection result by the voltage sensor 83, and switches between the first control mode and the second control mode based on the evaluation result.

For example, the mode switching unit 151 calculates an absolute value of a difference between the potential difference Vpm detected by the voltage sensor 82 and the potential difference Vmn detected by the voltage sensor 83 as a fluctuation level of the neutral potential, and sets a supply current target value Iamp to a predetermined value greater than zero when the fluctuation level exceeds a predetermined fluctuation threshold. When the fluctuation level is below the fluctuation threshold, the mode switching unit 151 sets the supply current target value Iamp to zero. The predetermined value may be the above-described lower limit current level or may be a value obtained by adding a predetermined margin to the lower limit current level. As will be described later, when the supply current target value Iamp is greater than zero, the control in the first control mode is executed. When the supply current target value Iamp is below zero, the control in the second control mode is executed. Thus, the first control mode and the second control mode can be switched depending on whether the supply current target value Iamp is set to a predetermined value greater than zero or to zero.

Alternatively, the mode switching unit 151 may switch between the first control mode and the second control mode based on the magnitude of the supply current instead of the fluctuation level of the neutral potential. For example, the mode switching unit 151 may set the supply current target value Iamp to a predetermined value greater than zero when the magnitude of the supply current is below a predetermined current threshold, and may set the supply current target value Iamp to zero when the magnitude of the supply current exceeds the current threshold.

The current calculation unit 152 calculates the magnitude of the supply current. For example, the current calculation unit 152 calculates a supply current value Iout by the following equation based on the d-axis current command Id_ref and the q-axis current command Iq_ref in the immediately preceding control cycle.

Equation (1)

$$Iout = \sqrt{Id\_ref^2 + Iq\_ref^2} \qquad (1)$$

A current adjustment value calculation unit 153 calculates the d-axis current command Id_ref so as to maintain the supply current value Iout at a supply current target value Iamp or greater. For example, the current adjustment value calculation unit 153 multiplies the deviation between the supply current target value Iamp and the supply current value Iout by a gain, and performs limiting processing of limiting the multiplication result to zero when the multiplication result is equal to or less than zero, while performing low-pass filtering processing on the result of the limiting processing to calculate the d-axis current adjustment value dId2. The current adjustment value calculation unit 153 calculates the d-axis current command Id_ref by adding the d-axis current adjustment value dId2 to the d-axis current command Id_ref2.

For example, the gain by which the current adjustment value calculation unit 153 multiplies the deviation between the supply current target value Iamp and the supply current value Iout, and a time constant of the filtering processing performed by the current adjustment value calculation unit 153 are set as follows. A transfer function between the supply current target value Iamp and the supply current value Iout generated according to the supply current target value Iamp is expressed by the following equation.

Equation (2)

$$\frac{Iout}{Iamp} = \frac{K}{1+K} \times \frac{\omega n(1+K)}{s + \omega n(1+K)} \qquad (2)$$

K: gain, ωn: cutoff frequency

Equation (2) shows that the response frequency is ωn(1+K), but converges to K/(1+K) as a steady-state value. The gain and cutoff frequency can be set based on these relationships, a desired steady-state value, and a desired response frequency.

The strengthening/weakening switching unit 154 switches the positive/negative sign of the d-axis current adjustment value dId2 based on whether or not the voltage V applied from the switching circuit 16 to the motor 2 exceeds a predetermined reference voltage level.

The magnitude of the applied voltage V can be represented by a modulation factor (a ratio of the applied voltage V to a potential difference Vpn between the second potential and the first potential). For example, the applied voltage V is a root sum square of the d-axis voltage command Vd_ref and the q-axis voltage command Vq_ref. When the magnitude of the applied voltage V is represented by the modulation factor, the reference voltage level is also represented by the modulation factor. Hereinafter, the reference voltage level represented by the modulation factor is referred to as a "reference modulation factor".

For example, the strengthening/weakening switching unit 154 switches the positive/negative sign of the d-axis current adjustment value dId2 based on whether or not the modulation factor exceeds a reference modulation factor (for example, 0.5). When the modulation factor exceeds the reference modulation factor, the strengthening/weakening switching unit 154 sets the d-axis current adjustment value dId2 to a negative value. As a result, a current that weakens a back electromotive force is added to the d-axis current command Id_ref2. When the modulation factor is below the reference modulation factor, the strengthening/weakening switching unit 154 sets the d-axis current adjustment value dId2 to a positive value. As a result, a current that strengthens the back electromotive force is added to the d-axis current command Id_ref2.

The driving force adjustment unit 155 calculates the q-axis current command Iq_ref based on the d-axis current command Id_ref such that the motor 2 generates the torque corresponding to the target torque T_ref. For example, the driving force adjustment unit 155 calculates the q-axis current command Iq_ref by the following equation.

Equation (3)

$$\text{Iq\_ref} = \frac{(Ke + (Ld - Lq)\text{Id\_ref2})}{(Ke + (Ld - Lq)\text{Id\_ref})} \times \text{Iq\_ref2} \quad (3)$$

Ke: constant of induced voltage of motor, Ld: d-axis inductance, Lq: q-axis inductance The operation flag generation unit 156 generates the control signals Cnt2, Cnt3 based on the d-axis current adjustment value dId2 described above, and outputs them respectively to the FB-type energy saving calculation unit 122 and the FB-type constant output calculation unit 123. For example, when the absolute value of the d-axis current adjustment values dId2 exceeds a predetermined threshold, the operation flag generation unit 156 generates the control signals Cnt2, Cnt3 indicating that the d-axis current command Id_ref2 is changed by the current adjustment unit 125. When the absolute value of the d-axis current adjustment value dId2 is lower than the threshold, the operation flag generation unit 156 generates the control signals Cnt2, Cnt3 indicating that the d-axis current command Id_ref2 is not changed by the current adjustment unit 125.

When the supply current value Iout is below the supply current target value Iamp, the result of the limiting processing by the current adjustment value calculation unit 153 becomes a value greater than zero. Thus, the d-axis current command Id_ref2 that has been changed by the addition of the d-axis current adjustment value dId2 to change the deviation between the supply current target value Iamp and the supply current value Iout becomes the d-axis current command Id_ref. Since the supply current value Iout is maintained at the lower limit current level or greater, the switching circuit 16 is controlled in the above-described first control mode. When the supply current value Iout is greater than the supply current target value Iamp, the result of the limiting processing by the current adjustment value calculation unit 153 is zero, and the d-axis current adjustment value dId2 is also zero. For this reason, the d-axis current command Id_ref2 is not changed and becomes the d-axis current command Id_ref. As the supply current target value Iamp is zero, the d-axis current adjustment value dId2 is constantly zero. This controls the switching circuit 16 in the second control mode described above, because no control is performed to increase the supply current value Iout equal to or greater than the lower limit current level.

In the second control mode, when the voltage command value V_ref is less than the upper limit voltage value V_lim, the FF-type energy saving calculation unit 121, the FB-type energy saving calculation unit 122, and the current adjustment unit 125 generates the d-axis current command Id_ref and the q-axis current command Iq_ref so as to minimize the supply current and cause the motor 2 to generate the torque corresponding to the target torque T_ref. In the second control mode, when the voltage command value V_ref is greater than the upper limit voltage value V_lim, the FB-type constant output calculation unit 123 and the current adjustment unit 125 generate the d-axis current command Id_ref and the q-axis current command Iq_ref so as to cause the motor 2 to generate torque corresponding to the target torque T_ref, while maintaining the voltage applied from the switching circuit 16 to the motor 2 at the predetermined upper limit voltage level. In performing the speed control by a speed control unit (not illustrated), when the voltage command value V_ref is greater than the upper limit voltage value V_lim in the second control mode, the FB-type constant output calculation unit 123 and the speed control unit may generate the d-axis current command Id_ref and the q-axis current command Iq_ref so as to cause the motor 2 to generate a speed corresponding to the speed command, while maintaining the voltage applied from the switching circuit 16 to the motor 2 at the predetermined upper limit voltage level.

In the first control mode, increasing the supply current to not affect the driving force is not necessarily limited to maintaining the supply current at the predetermined lower limit current level or greater. For example, the current adjustment unit 125 may be configured to dynamically change the lower limit current level based on the detection value of the neutral potential. For example, the current adjustment unit 125 may dynamically calculate the lower limit current level by performing a proportional operation, a proportional/integration operation, a proportional/integration/differentiation operation on the deviation between the detection value of the neutral potential and the target value of the neutral potential. The current adjustment unit 125 may also be configured to calculate a current correction amount by performing a proportional operation, a proportional/integration operation, a proportional/integration/differentiation operation on the deviation between the detection value of the neutral potential and the target value of the neutral potential, and generate the current command (for example, the d-axis current command Id_ref and the q-axis current command Iq_ref) based on the calculated current correction amount.

FIG. 6 is a block diagram illustrating an example of a hardware configuration of the control circuit 100. For example, as illustrated in FIG. 6, the control circuit 100 includes at least one processor 191, a memory 192, a storage 193, an I/O port 194, and a switching control circuit 195.

The storage 193 includes a nonvolatile storage medium such as a flash memory or a hard disk. The storage 193 stores a program to cause the control circuit 100 to control the power conversion circuit 10. For example, the storage 193 stores a program for causing the control circuit 100 to configure each of the aforementioned function blocks.

The memory 192 temporarily stores a program loaded from the storage 193 and data generated in the execution process of the program. The at least one processor 191 execute the program stored in the memory 192 to function the control circuit 100 as respective functional blocks. The I/O port 194 inputs and outputs electric signals between the current sensor 81 and the voltage sensors 82, 83 in response to the command from the at least one processor 191. In response to the command from the at least one processor 191, the switching control circuit 195 controls the switching circuit 16. The hardware configuration described above is merely an example, and can be changed appropriately. For example, at least any one of the functional blocks may be configured by a dedicated circuit element such as an application specific integrated circuit (ASIC).

In the above description, the control system calculates the d-axis current command Id_ref and the q-axis current command Iq_ref based on the target torque T_ref, and allows the supply current to correspond to the d-axis current command Id_ref and the q-axis current command Iq_ref to control the switching circuit 16, thus maintaining the supply current equal to the lower limit current level or greater so as not to affect driving force. However, this is merely an example configuration and can be changed appropriately. For example, even in the control system that controls the torque based on the magnitude of the magnetic flux and the phase of the magnetic flux, the supply current can be maintained at the lower limit current level or greater so as not to affect the driving force. In that case, for example, the magnitude of a magnetic flux can be changed so as to maintain the supply current at the lower limit current level or greater, and the phase of the magnetic flux can be calculated so as to cause the motor 2 to generate the driving force corresponding to the target driving force with the magnetic flux whose magnitude has been changed. In the control system of the induction motor, the supply current can also be maintained at the lower limit current level or greater so as not to affect the driving force. In that case, for example, the magnitude of an excitation current can be changed so as to maintain the supply current at the lower limit current level or greater, and the torque current can be calculated so as to cause the motor 2 to generate the driving force corresponding to the target driving force with the excitation current whose magnitude has been changed.

Power Conversion Method

A power conversion procedure executed by the power conversion device 3 will be described as an example of a power conversion method. The procedure includes supplying a current to the motor 2 by connecting and disconnecting by the first point 11, the second point 12, and the neutral point 13 to and from the motor 2 by the switching circuit 16, performing the neutral potential control by controlling the switching circuit 16 in a manner to maintain the neutral potential within a target range, and increasing a supply current to the motor 2 in a manner not to affect the driving force generated by the motor 2 and controlling the switching circuit 16 in a manner to maintain the magnitude of the supply current at a lower limit current level or greater at least when performing the neutral potential control. Hereinafter, this procedure is described by dividing the procedure into a current control procedure and a neutral potential control procedure. Examples of the procedures are described below.

Current Control Procedure

As illustrated in FIG. 7, the control circuit 100 sequentially executes steps S01, S02, S03, S04, and S05. In step S01, the coordinate conversion unit 117 performs coordinate conversion on the phase currents Iu, Iv, Iw, which are detected by the current sensor 81, based on the magnetic pole position θ detected by the magnetic pole position detection unit 116, and calculates the d-axis current Id and the q-axis current Iq.

In step S02, the current command generation unit 113 repeatedly generates the d-axis current command Id_ref and the q-axis current command Iq_ref in the rotating coordinate system at a predetermined control cycle. A method for generating the d-axis current command Id_ref and the q-axis current command Iq_ref by the current command generation unit 113 will be described later.

In step S03, the voltage command generation unit 114 generates the d-axis voltage command Vd_ref and the q-axis voltage command Vq_ref to allow the supply current to correspond to the d-axis current command Id_ref and the q-axis current command Iq_ref In step S04, the PWM control unit 115 controls the switching circuit 16 so as to apply a voltage corresponding to the d-axis voltage command Vd_ref and the q-axis voltage command Vq_ref to the motor 2. For example, the PWM control unit 115 calculates the above-described switching pattern such that the voltage corresponding to the d-axis voltage command Vd_ref and the q-axis voltage command Vq_ref is applied to the motor 2, and controls the switching circuit 16 so as to repeat the switching pattern. In step S05, the current command generation unit 113 waits until the control cycle has elapsed. Then, the control circuit 100 returns the processing to step S01. The control circuit 100 repeatedly executes the processing described above.

Neutral Potential Control Procedure

The neutral potential control procedure is executed in parallel with the current control procedure described above. As illustrated in FIG. 8, the control circuit 100 first executes steps S11, S12. In step S11, the neutral potential control unit 111 acquires the phase currents Iu, Iv, Iw detected by the current sensor 81 and the potential difference Vpm and the potential difference Vmn detected by the voltage sensors 82, 83. In step S12, the neutral potential control unit 111 checks whether or not the potential difference Vpm is greater than the potential difference Vmn. The neutral potential control unit 111 may determine whether or not the potential difference Vpm is greater than the potential difference Vmn based on whether or not the difference between the potential difference Vpm and the potential difference Vmn is greater than a predetermined difference value dVlim. Hysteresis may be provided for the determination based on the difference between the potential difference Vpm and the potential difference Vmn.

In step S12, if it is determined that the potential difference Vpm is equal to or less than the potential difference Vmn, the control circuit 100 executes step S13. In step S13, the neutral potential control unit 111 checks whether or not the potential difference Vmn is greater than the potential difference Vpm. In step S13, if it is determined that the potential difference Vmn is equal to or less than the potential difference Vpm, the control circuit 100 returns the processing to step S11. For example, the neutral potential control unit 111 may determine whether or not the potential difference Vmn is greater than the potential difference Vpm based on whether the difference between the potential difference Vmn and the potential difference Vpm is greater than the predetermined difference value dVlim. Hysteresis may be provided in the determination based on the difference between the potential difference Vmn and the potential difference Vpm.

In step S12, if it is determined that the potential difference Vpm is greater than the potential difference Vmn, the control circuit 100 executes steps S14, S15. In step S14, the neutral potential control unit 111 calculates the supply direction of the supply current based on the detection result of the current sensor 81, and specifies the relationship between the lengths of the first and second periods described above and the neutral potential based on the supply direction of the supply current.

In step S15, the neutral potential control unit 111 changes the relationship between the length of the first period and the length of the second period so as to decrease the potential difference Vpm and increase the potential difference Vmn based on the basis of the relationship specified in step S14.

In step S13, if it is determined that the potential difference Vmn is greater than the potential difference Vpm, the control circuit 100 executes steps S16, S17. In step S16, the neutral potential control unit 111 calculates the supply direction of the supply current based on the detection result of the current sensor 81, and specifies the relationship between the lengths of the first and second periods described above and the neutral potential based on the supply direction of the supply current.

In step S17, the neutral potential control unit 111 changes the relationship between the length of the first period and the length of the second period so as to increase the potential difference Vpm and decrease the potential difference Vmn based on the relationship specified in step S16.

After executing steps S15, S17, the control circuit 100 returns the processing to step S11. The control circuit 100 repeatedly executes the processing described above.

Current Command Generation Procedure

An example of a procedure of generating the d-axis current command Id_ref and the q-axis current command Iq_ref in step S03 is described. As illustrated in FIG. 9, the control circuit 100 sequentially executes steps S21, S22, S23, S24, and S25.

In step S21, the FF-type energy saving calculation unit 121 calculates the d-axis current command Id_ref0 and the q-axis current command Iq_ref0 so as to minimize the supply current for causing the motor 2 to generate the torque corresponding to the target torque T_ref In step S22, the FB-type energy saving calculation unit 122 acquires the power fluctuation P0 described above as a feedback value and calculates the d-axis current command Id_ref1 and the q-axis current command Iq_ref1 by changing the phase angle of the d-axis current command Id_ref0 and the q-axis current command Iq_ref0 so that the power fluctuation P0 approaches zero. In step S23, the FB-type constant output calculation unit 123 corrects the d-axis current command Id_ref1 while maintaining the applied voltage applied from the switching circuit 16 to the motor 2 at the above-described upper limit voltage level. In step S24, the probe signal superimposing unit 124 superimposes the above-described probe signal on the d-axis current command Id_ref1 (the d-axis current command Id_ref1 to which the d-axis current correction value dId1 is added) and the q-axis current command Iq_ref1, and calculates the d-axis current command Id_ref2 and the q-axis current command Iq_ref2. In step S25, the current adjustment unit 125 increases the supply current to the motor 2 so as not to affect the driving force generated by the motor 2, and calculates the d-axis current command Id_ref and the q-axis current command Iq_ref so as to maintain the magnitude of the supply current at the predetermined lower limit current level or greater. Thus, the current command generation procedure is completed.

FIG. 10 is a flowchart illustrating an example of a calculation procedure of the d-axis current command Id_ref1 and the q-axis current command Iq_ref1 in step S22. As illustrated in FIG. 10, the control circuit 100 first executes steps S31, S32, and S33. In step S31, the active power calculation unit 131 calculates the active power P based on the α-axis current Iα, the β-axis current Iβ, the α-axis voltage Vα, and the β-axis voltage Vβ calculated by the coordinate conversion unit 117. In step S32, the probe component extraction unit 132 extracts the power fluctuation P0 corresponding to the above-described phase fluctuation from the active power P. In step S33, the correction angle calculation unit 133 calculates a deviation between the power fluctuation P0 and the fluctuation target value P_ref (for example, zero) described above. Hereinafter, this deviation is referred to as a "power deviation".

The control circuit 100 then executes step S34. In step S34, the correction angle calculation unit 133 checks whether or not the d-axis current command Id_ref1 has been changed by the d-axis current correction value dId1 described above based on the control signal Cnt1 described above. If it is determined in step S34 that the d-axis current command Id_ref1 has not been changed by the d-axis current correction value dId1, the control circuit 100 executes step S35. In step S35, the correction angle calculation unit 133 checks whether or not the d-axis current command Id_ref2 has been changed by the d-axis current adjustment value dId2 based on the control signal Cnt2.

In step S35, if it is determined that the d-axis current command Id_ref2 has not been changed by the d-axis current adjustment value dId2, the control circuit 100 executes step S36. In step S36, the correction angle calculation unit 133 integrates the power deviation, and calculates the phase correction angle θadj based on the power deviation and the integration result of the power deviation.

If it is determined in step S34 that the d-axis current command Id_ref1 has been changed by the d-axis current correction value dId1, or if it is determined in step S35 that the d-axis current command Id_ref2 has been changed by the d-axis current adjustment value dId2, the control circuit 100 executes step S37. In step S37, the correction angle calculation unit 133 stops integration of the current deviation, and calculates the phase correction angle θadj based on the current deviation and not based on the integration result of the current deviation.

After executing steps S36, S37, the control circuit 100 executes step S38. In step S38, the current correction unit 134 corrects the phase angle of the d-axis current command Id_ref0 and the q-axis current command Iq_ref0 with the phase correction angle θadj, and calculates the d-axis current command Id_ref1 and the q-axis current command Iq_ref1.

FIG. 11 is a flowchart illustrating an example of a correction procedure of the d-axis current command Id_ref1 in step S23. As illustrated in FIG. 11, the control circuit 100 first executes steps S41, S42. In step S41, the current correction value calculation unit 141 calculates the deviation between the upper-limit voltage value V_lim and the voltage command value V_ref. Hereinafter, this deviation is referred to as a "voltage deviation". In step S42, the current correction value calculation unit 141 checks whether or not the d-axis current command Id_ref2 has been changed by the d-axis current adjustment value dId2, based on the control signal Cnt3.

In step S42, if it is determined that the d-axis current command Id_ref2 has not been changed by the d-axis current adjustment value dId2, the control circuit 100 executes step S43. In step S43, the current correction value calculation unit 141 integrates the voltage deviation and calculates the d-axis current correction value dId1 based on the voltage deviation and the integration result of the voltage deviation. In step S42, if it is determined that the d-axis current command Id_ref2 has been changed by the d-axis current adjustment value dId2, the control circuit 100 executes step S44. In step S44, the current correction value calculation unit 141 stops integration of the voltage deviation and calculates the d-axis current correction value dId1 based on the voltage deviation and not based on the integration result of the voltage deviation.

After steps S43, S44 are executed, the control circuit 100 executes step S45. In step S45, the limiter 142 checks whether or not the d-axis current correction value dId1 is greater than zero. If it is determined in step S45 that the d-axis current correction value dId1 is greater than zero (the voltage command value V_ref is below the upper limit voltage value V_lim), the control circuit 100 executes steps S46, S47.

In step S46, the limiter 142 sets the d-axis current correction value dId1 to zero. In step S47, the limiter 142 generates the control signal Cnt1 indicating that the d-axis current command Id_ref1 is not changed by the d-axis current compensation value dId1.

In step S45, if it is determined that the d-axis current correction value dId1 is equal to or less than zero, the control circuit 100 executes the step S48. In step S48, the limiter 142 generates the control signal Cnt1 indicating that the d-axis current command Id_ref1 is changed by the d-axis current correction value dId1.

After executing steps S47, S48, the control circuit 100 executes step S51. In step S51, the limiter 142 adds the d-axis current correction value dId1 to the d-axis current command Id_ref1.

FIG. 12 is a flowchart illustrating an example of a calculation procedure of the d-axis current command Id_ref and the q-axis current command Iq_ref in step S25. As illustrated in FIG. 12, the control circuit 100 first executes step S61. The mode switching unit 151 checks whether or not the fluctuation level, which is the absolute value of the difference between the potential difference Vpm detected by the voltage sensor 82 and the potential difference Vmn detected by the voltage sensor 83, is greater than a predetermined fluctuation threshold. If it is determined that the fluctuation level is equal to or less than the fluctuation threshold, the control circuit 100 executes step S62. In step S62, it is checked whether or not the fluctuation level is less than the fluctuation threshold.

The fluctuation threshold in step S61 and the fluctuation threshold in step S62 may be different from each other. For example, the fluctuation threshold in step S61 may be greater than the fluctuation threshold in step S62.

In step S61, if it is determined that the fluctuation level is greater than the threshold, the control circuit 100 executes step S63. In step S63, the mode switching unit 151 sets the above-described supply current target value lamp to the predetermined value greater than zero.

In step S62, if it is determined that the fluctuation level is less than the threshold, the control circuit 100 executes step S64. In step S64, the mode switching unit 151 sets the above-described supply current target value lamp to zero.

After executing steps S63, S64, the control circuit 100 executes steps S65, S66. In step S62, if it is determined that the fluctuation level is equal to or greater than the fluctuation threshold, the control circuit 100 executes steps S65, S66 without executing steps S63, S64. In that case, the supply current target value lamp is maintained at a value set in one or greater previous control cycles.

In step S65, the current calculation unit 152 calculates the supply current value Iout. In step S66, the current adjustment value calculation unit 153 calculates the d-axis current command Id_ref such that the supply current value Iout is maintained at the supply current target value lamp or greater. For example, the current adjustment value calculation unit 153 multiplies the deviation between the supply current target value lamp and the supply current value Iout by a gain, and performs the limiting processing of limiting the multiplication result to zero or greater.

The control circuit 100 is executed in step S67. In step S67, the strengthening/weakening switching unit 154 checks whether or not the modulation factor is greater than the reference modulation factor. In step S67, if it is determined whether or not the modulation factor is greater than the reference modulation factor, the control circuit 100 executes step S68. In step S68, the strengthening/weakening switching unit 154 sets the d-axis current adjustment value dId2 to a negative value. In step S67, if it is determined that the modulation factor is equal to or less than the reference modulation factor, the control circuit 100 executes step S69. In step S69, the strengthening/weakening switching unit 154 sets the d-axis current adjustment value dId2 to a positive value. Hysteresis may be provided for the determination of steps S67, S68, and S69.

After executing steps S68, S69, the control circuit 100 executes steps S71, S72 as illustrated in FIG. 13. In step S71, the current adjustment value calculation unit 153 performs the above-described low-pass filtering processing on the d-axis current adjustment value dId2.

In step S72, the operation flag generation unit 156 checks whether or not the absolute value of the d-axis current adjustment value dId2 is less than a predetermined value. In step S72, if it is determined that the absolute value of the d-axis current adjustment value dId2 is below the threshold, the control circuit 100 executes step S73. In step S73, the operation flag generation unit 156 generates the control signals Cnt2, Cnt3 indicating that the d-axis current command Id_ref2 is not changed by the d-axis current adjustment value dId2. In step S72, if it is determined that the absolute value of the d-axis current adjustment value dId2 is equal to or greater than the threshold, the control circuit 100 executes step S74. In step S74, the operation flag generation unit 156 generates the control signals Cnt2, Cnt3 indicating that the d-axis current command Id_ref2 is changed by the d-axis current adjustment value dId2.

After executing steps S73, S74, the control circuit 100 executes steps S75, S76. In step S75, the current adjustment value calculation unit 153 calculates the d-axis current command Id_ref by adding the d-axis current command dId2 to the d-axis current command Id_ref2.

In step S76, the driving force adjustment unit 155 calculates the q-axis current command Iq_ref based on the d-axis current command Id_ref such that the motor 2 generates the torque corresponding to the target torque T_ref.

CONCLUSION

The embodiment described above includes the following configurations.

(1) A power conversion device 3 including a switching circuit 16 configured to supply a current to a motor 2 by connecting and disconnecting a first point 11 having a first potential, a second point 12 having a second potential greater than the first potential, and a neutral point 13 having a neutral potential between the first potential and the second potential to and from the motor 2, a neutral potential control unit 111 configured to control the switching circuit 16 in a manner to maintain the neutral potential within a target range, and a current control unit 112 configured to increase a supply current to the motor 2 without affecting a driving force generated by the motor 2 at least when controlling the switching circuit 16 by the neutral potential control unit 111. The power conversion device 3 can perform power conversion for multilevel voltage output including at least the first voltage level corresponding to the difference between the neutral potential and the first potential or the difference between the second potential and the neutral potential, and the second voltage level corresponding to the difference between the second potential and the first potential. Although stabilization of the neutral potential is necessary to improve the controllability of the electric power, it is difficult to change the neutral potential by controlling the switching circuit 16 when the current output to the motor 2 for generating the driving force is less (for example, during no-load operation). This possibly decreases the controllability of power due to the unstable neutral potential. The power conversion device 3 increases the supply current by the current control unit 112 without affecting the driving force, even when the driving force generated by the motor 2 is less. This facilitates the change of the neutral potential under the control of the switching circuit 16. Therefore, the power conversion device 3 is effective in improving the controllability of power.

(2) The power conversion device 3 as recited in (1), in which at least when controlling the switching circuit 16 by the neutral potential control unit 111, the current control unit 112 increases the supply current without affecting the driving force generated by the motor 2 and controls the switching circuit 16 in a manner to maintain a magnitude of the supply current at a predetermined lower limit current level or greater.

Since the supply current is maintained at the lower limit current level or greater, the neutral potential can be changed easily under control of the switching circuit 16.

(3) The power conversion device 3 as recited in (1) or (2), further including a first capacitor 14 connected to the first point 11 and the neutral point 13, and a second capacitor 15 connected to the second point 12 and the neutral point 13, in which the neutral potential control unit 111 changes the relationship between a length of a period during which the switching circuit 16 causes the current to flow between the first capacitor 14 and the motor 2 and a length of a period during which the switching circuit 16 causes a current to flow between the second capacitor 15 and the motor 2, whereby the neutral potential is maintained within the target range.

Maintaining the magnitude of the output current at the lower limit current level or greater is more effective in stabilizing the neutral potential.

(4) The power conversion device 3 as recited in (3), in which the switching circuit 16 repeats a switching pattern including a first period in which a voltage corresponding to a difference between the neutral potential and the first potential is applied to the motor 2 and a second period in which a voltage corresponding to a difference between the second potential and the neutral potential is applied to the motor 2, and the neutral potential control unit 111 changes the relationship between a length of the first period and a length of the second period in the switching pattern, whereby the neutral potential is maintained within the target range.

This allows the neutral potential to be more easily maintained within the target range.

(5) The power conversion device 3 as recited in (4), in which the neutral potential control unit 111 changes the relationship between the length of the first period and the length of the second period based on a supply direction of the supply current and the neutral potential in a manner to maintain the neutral potential within the target range.

When the current control unit 112 increases the supply current to the motor 2 without affecting the driving force, the supply direction of the supply current is also changed. The relationship between the length of the first period and the length of the second period in order to maintain the neutral potential within the target range also depends on the direction of the supply current. With the configuration in which the neutral potential control unit 111 changes the relationship between the length of the first period and the length of the second period based on both the supply direction of the supply current and the neutral potential, the neutral potential can be controlled without being affected by the change even when the direction of the supply current is changed by the current control unit 112.

(6) The power conversion device 3 as recited in any one of (1) to (5), in which the current control unit 112 calculates a first current command corresponding to a magnetic pole direction of the motor 2 when increasing the supply current without affecting the driving force, calculates a second current command corresponding to a direction perpendicular to the magnetic pole direction based on the first current command in a manner to cause the motor 2 to generate the driving force corresponding to a target driving force, and controls the switching circuit 16 in a manner to allow the supply current to correspond to the first current command and the second current command.

This changes the current that does not contribute to the generation of the driving force in the motor 2 quickly and appropriately.

(7) The power conversion device 3 as recited in any one of (1) to (6), further including a control mode switching unit 151 configured to switch between a first control mode in which the supply current is controlled to increase without affecting the driving force and a second control mode in which the supply current is not controlled to increase without affecting the driving force, based on a magnitude of fluctuation of the neutral potential.

When the fluctuation of the neutral potential is less, the first control mode is changed to the second control mode in which the current can be controlled in response to a request (for example, a request for improving efficiency) different from the control of the neutral potential. This achieves both diversity and controllability in the power control.

(8) The power conversion device 3 as recited in any one of (1) to (6), further including a mode switching unit 151 configured to switch between a first control mode in which the supply current is controlled to increase without affecting the driving force and a second control mode in which the supply current is not controlled to increase without affecting the driving force, based on a magnitude of the supply current.

When a great current is supplied to the motor 2 to generate the driving force, the first control mode is changed to the second control mode in which the current can be controlled in response to a request (for example, a request for improving efficiency) different from the control of the neutral potential. This achieves both diversity and controllability in the power control.

(9) The power conversion device 3 according to (7) or (8), in which the current control unit 112, in the first control mode, calculates a current command to increase the supply current in a manner not to affect the driving force, and in the second control mode, calculates the current command to minimize the supply current for causing the motor 2 to generate the driving force corresponding to the target driving force, and controls the switching circuit 16 in a manner to allow the supply current to correspond to the current command.

The second control mode can be easily utilized to maximize the generation efficiency of the driving force.

(10) The power conversion device 3 as recited in any one of (7) to (9), in which the current control unit 112, in the first control mode, calculates a current command to increase the supply current without affecting the driving force, and in the second control mode, calculates the current command to cause the motor 2 to generate the driving force corresponding to a target driving force, while maintaining an applied voltage to the motor 2 from the switching circuit 16 at a predetermined upper limit voltage level, and controls the switching circuit 16 in a manner to allow the supply current to correspond to the current command.

The second control mode can be easily utilized for the control of causing the motor 2 to generate the driving force corresponding to the target driving force, while maintaining the applied voltage at the upper limit voltage level.

(11) The power conversion device 3 according to any one of (1) to (6), in which the current control unit 112 includes a first calculation unit 122, 123 that calculates the current command in a manner to cause the motor 2 to generate the driving force corresponding to the target driving force while reducing a deviation between a predetermined control target value and a predetermined value to be controlled, a second calculation unit 125 that corrects the current command by increasing the supply current without affecting the driving force, and a control unit 115 that controls the switching circuit 16 to allow the supply current to correspond to the current command.

Fluctuations in the operation of the motor 2 can be suppressed during transition between a control mode in which the second calculation unit 125 performs no correction of the current command and the control mode in which the second calculation unit 125 corrects the current command.

(12) The power conversion device 3 as recited in (11), in which the first calculation unit 122, 123 integrates the deviation and calculates the current command based on the deviation and an integration result of the deviation when the second calculation unit 125 performs no correction of the current command, and stops integration of the deviation and calculates the current command based on the deviation when the second calculation unit 125 corrects the current command.

This further suppresses changes in the operation of the motor 2.

(13) The power conversion device 3 as recited in any one of (1) to (6), in which the current control unit 112 adds a current that weakens a back electromotive force generated in the motor 2 without affecting the driving force and increases the magnitude of the supply current to the lower limit current level or greater, when an applied voltage applied to the motor 2 from the switching circuit 16 exceeds a predetermined reference voltage level, and adds a current that strengthens the back electromotive force without affecting the driving force and increases the magnitude of the supply current to the lower limit current level or greater, when the applied voltage is below the reference voltage level.

The margin of change in the current that does not contribute to the generation of the driving force in the motor 2 can be increased.

(14) A driving system 1 including the power conversion device 3 according to any one of (1) to (13), and the motor 2, in which the motor 2 is a synchronous motor 2.

In the synchronous motor 2, the current output to the motor 2 for generating the driving force tends to be less when the driving force generated by the motor 2 is less. Therefore, it is more effective to compensate for the current that does not contribute to the generation of the driving force.

(15) A power conversion method including supplying a current to a motor 2 by connecting and disconnecting a first point 11 having a first potential, a second point 12 having a second potential greater than the first potential, and a neutral point 13 having a neutral potential between the first potential and the second potential to and from the motor 2, controlling the neutral potential by controlling the switching circuit 16 in a manner to maintain the neutral potential within a target range, and increasing a supply current to the motor 2 without affecting a driving force generated by the motor 2 at least when performing the neutral potential control.

(16) The power conversion method as recited in (15), in which at least when performing the neutral potential control, increasing the supply current to the motor 2 without affecting the driving force generated by the motor 2 and controlling the switching circuit 16 to maintain the magnitude of the supply current at a predetermined lower limit current level or greater.

REFERENCE SIGNS LIST

1 Driving system, 2 Motor, 3 Power conversion device, 10 Power conversion circuit, 11 First point, 12 Second point, 13 Neutral point, 14 First capacitor, 15 Second capacitor, 16 Switching circuit, 111 Neutral potential control unit, 112 Current control unit, 115 Control unit, 122, 123 First calculation unit, 125 Second calculation unit, 151 Mode switching unit

What is claimed is:

1. A power conversion device comprising:
    a switching circuit configured to supply a current to a motor by connecting and disconnecting a first point having a first potential, a second point having a second potential greater than the first potential, and a neutral point having a neutral potential between the first potential and the second potential to and from the motor;
    a neutral potential control unit configured to control the switching circuit in a manner to maintain the neutral potential within a target range; and
    a current control unit configured to increase a supply current to the motor without affecting a driving force generated by the motor at least when controlling the switching circuit by the neutral potential control unit.

2. The power conversion device according to claim 1, wherein
    at least when controlling the switching circuit by the neutral potential control unit, the current control unit increases the supply current without affecting the driving force generated by the motor and controls the switching circuit in a manner to maintain a magnitude of the supply current at a predetermined lower limit current level or greater.

3. The power conversion device according to claim 1, further comprising:
    a first capacitor connected to the first point and the neutral point; and
    a second capacitor connected to the second point and the neutral point, wherein
    the neutral potential control unit changes the relationship between a length of a period during which the switching circuit causes a current to flow between the first capacitor and the motor and a length of a period during which the switching circuit causes a current to flow between the second capacitor and the motor, whereby the neutral potential is maintained within the target range.

4. The power conversion device according to claim 3, wherein
    the switching circuit repeats a switching pattern including a first period in which a voltage corresponding to a difference between the neutral potential and the first potential is applied to the motor and a second period in which a voltage corresponding to a difference between the second potential and the neutral potential is applied to the motor, and the neutral potential control unit changes the relationship between a length of the first period and a length of the second period in the switching pattern, whereby the neutral potential is maintained within the target range.

5. The power conversion device according to claim 4, wherein the neutral potential control unit changes the relationship between the length of the first period and the length of the second period based on a supply direction of the supply current and the neutral potential in a manner to maintain the neutral potential within the target range.

6. The power conversion device according to claim 1, wherein the current control unit calculates a first current command corresponding to a magnetic pole direction of the motor when increasing the supply current without affecting the driving force, calculates a second current command corresponding to a direction perpendicular to the magnetic pole direction based on the first current command in a manner to cause the motor to generate the driving force corresponding to a target driving force, and controls the switching circuit in a manner to allow the supply current to correspond to the first current command and the second current command.

7. The power conversion device according to claim 1, further comprising:

a control mode switching unit configured to switch between a first control mode in which the supply current is controlled to increase without affecting the driving force and a second control mode in which the supply current is not controlled to increase without affecting the driving force, based on a magnitude of fluctuation of the neutral potential.

8. The power conversion device according to claim 7, wherein the current control unit, in the first control mode, calculates a current command to increase the supply current without affecting the driving force, and in the second control mode, calculates the current command to minimize the supply current in a manner to cause the motor to generate the driving force corresponding to a target driving force, and controls the switching circuit in a manner to allow the supply current to correspond to the current command.

9. The power conversion device according to claim 7, wherein the current control unit, in the first control mode, calculates a current command to increase the supply current without affecting the driving force, and in the second control mode, calculates the current command to cause the motor to generate the driving force corresponding to a target driving force, while maintaining an applied voltage to the motor from the switching circuit at a predetermined upper limit voltage level, and controls the switching circuit in a manner to allow the supply current to correspond to the current command.

10. The power conversion device according to claim 1, further comprising:

a control mode switching unit configured to switch between a first control mode in which the supply current is controlled to increase without affecting the driving force and a second control mode in which the supply current is not controlled to increase without affecting the driving force, based on a magnitude of the supply current.

11. The power conversion device according to claim 1, wherein the current control unit includes a first calculation unit configured to calculate a current command in a manner to cause the motor to generate a driving force corresponding to a target driving force while reducing a deviation between a predetermined control target value and a predetermined value to be controlled, a second calculation unit configured to correct the current command to increase the supply current without affecting the driving force, and a control unit configured to control the switching circuit in a manner to allow the supply current to correspond to the current command.

12. The power conversion device according to claim 11, wherein the first calculation unit integrates the deviation and calculates the current command based on the deviation and an integration result of the deviation when the second calculation unit performs no correction of the current command, and stops integration of the deviation and calculates the current command based on the deviation when the second calculation unit corrects the current command.

13. The power conversion device according to claim 1, wherein the current control unit adds a current that weakens a back electromotive force generated in the motor without affecting the driving force and increase a magnitude of the supply current to a lower limit current level or greater, when an applied voltage applied to the motor from the switching circuit exceeds a predetermined reference voltage level, and adds a current that strengthens the back electromotive force without affecting the driving force and increase the magnitude of the supply current to the lower limit current level or greater, when the applied voltage is below the reference voltage level.

14. A driving system comprising:

the power conversion device according to claim 1; and the motor, wherein the motor is a synchronous motor.

15. A power conversion method comprising:

supplying a current to a motor by connecting and disconnecting a first point having a first potential, a second point having a second potential greater than the first potential, and a neutral point having a neutral potential between the first potential and the second potential to and from the motor by a switching circuit;

performing the neutral potential control by controlling the switching circuit in a manner to maintain the neutral potential within a target range; and increasing a supply current to the motor without affecting a driving force generated by the motor at least when performing the neutral potential control.

16. The power conversion method according to claim 15, wherein at least when performing the neutral potential control, increasing the supply current to the motor without affecting the driving force generated by the motor and controlling the switching circuit in a manner to maintain a magnitude of the supply current at a predetermined lower limit current level or greater.

* * * * *